(12) United States Patent
Ishikawa et al.

(10) Patent No.: US 11,498,632 B2
(45) Date of Patent: Nov. 15, 2022

(54) WORK VEHICLE

(71) Applicant: Kubota Corporation, Osaka (JP)

(72) Inventors: Junichi Ishikawa, Sakai (JP); Minoru Hiraoka, Sakai (JP)

(73) Assignee: Kubota Corporation, Osaka (JP)

( * ) Notice: Subject to any disclaimer, the term of this patent is extended or adjusted under 35 U.S.C. 154(b) by 104 days.

(21) Appl. No.: 17/047,807

(22) PCT Filed: Jun. 12, 2019

(86) PCT No.: PCT/JP2019/023212
§ 371 (c)(1),
(2) Date: Oct. 15, 2020

(87) PCT Pub. No.: WO2020/004024
PCT Pub. Date: Jan. 2, 2020

(65) Prior Publication Data
US 2021/0163089 A1    Jun. 3, 2021

(30) Foreign Application Priority Data

Jun. 25, 2018   (JP) .............................. JP2018-119978
Jun. 25, 2018   (JP) .............................. JP2018-119979
(Continued)

(51) Int. Cl.
*B62D 61/12* (2006.01)
*E02F 9/22* (2006.01)
*E02F 9/08* (2006.01)

(52) U.S. Cl.
CPC ............ *B62D 61/12* (2013.01); *E02F 9/0841* (2013.01); *E02F 9/225* (2013.01); *E02F 9/2257* (2013.01)

(58) Field of Classification Search
CPC .......... B62D 61/12; B60G 3/185; B60G 3/20; B60G 2202/413
See application file for complete search history.

(56) References Cited

U.S. PATENT DOCUMENTS 4,558,758 A * 12/1985 Littman ................ B66F 11/046
                                                  182/2.11
4,932,491 A *  6/1990 Collins, Jr. ............ B62D 49/08
                                                  280/5.2
(Continued)

FOREIGN PATENT DOCUMENTS

AT        507947 A1 *  9/2010 ............... B25J 5/007
CN     104401420 A  *  3/2015 ............. B62D 61/12
(Continued)

OTHER PUBLICATIONS

Hofbaur et al. AT 507947B1 Modular Robitc Drive, English Machine Translation, ip.com (Year: 2011).*

*Primary Examiner* — Karen Beck
(74) *Attorney, Agent, or Firm* — The Webb Law Firm

(57) ABSTRACT

A work vehicle including: a first link having one end portion supported by a vehicle body so as to be pivotable; a second link having one end portion pivotally coupled to the other end portion of the first link so as to be pivotable, and another end portion that supports a travel wheel; a first hydraulic cylinder capable of changing a swing posture of the first link; and a second hydraulic cylinder capable of changing a swing posture of the second link relative to the first link. The action of the first hydraulic cylinder is controlled such that a swing position of the first link is located at a target position, based on the result of detection performed by a position detection sensor, and the action of the second hydraulic cylinder is controlled such that thrust has a target value, based on the results of detection performed by pressure sensors.

17 Claims, 16 Drawing Sheets

(30) Foreign Application Priority Data

Jun. 25, 2018 (JP) .............................. JP2018-119980
Jun. 25, 2018 (JP) .............................. JP2018-119981
Jun. 25, 2018 (JP) .............................. JP2018-119982

(56) References Cited

U.S. PATENT DOCUMENTS

| | | | | |
|---|---|---|---|---|
| 5,590,898 A | * | 1/1997 | Williams | B60G 17/018 701/37 |
| 2005/0098975 A1 | * | 5/2005 | Yun | B60G 7/006 280/124.127 |
| 2009/0026719 A1 | * | 1/2009 | Koch | B60G 21/073 280/5.508 |
| 2016/0140861 A1 | * | 5/2016 | Tischer | G09B 9/04 434/69 |
| 2016/0288845 A1 | | 10/2016 | Honda et al. | |
| 2019/0077212 A1 | * | 3/2019 | Imaoka | B60G 7/001 |
| 2019/0241063 A1 | | 8/2019 | Honda et al. | |
| 2020/0282824 A1 | | 9/2020 | Honda et al. | |

FOREIGN PATENT DOCUMENTS

| | | | | |
|---|---|---|---|---|
| CN | 112172434 A | * | 1/2021 | ............. B60G 11/27 |
| JP | 55170182 U | | 12/1980 | |
| JP | S61500604 A | | 4/1986 | |
| JP | H61157 U | | 1/1994 | |
| JP | H9501630 A | | 2/1997 | |
| JP | H9131679 A | | 5/1997 | |
| JP | H9142347 A | | 6/1997 | |
| JP | 2005212671 A | | 8/2005 | |
| JP | 2007161105 A | | 6/2007 | |
| JP | 2016188559 A | | 11/2016 | |
| JP | 2017165169 A | | 9/2017 | |
| WO | 8502361 A1 | | 6/1985 | |
| WO | 9505303 A1 | | 2/1995 | |
| WO | WO-2007081452 A1 | * | 7/2007 | ............. B60G 3/185 |

* cited by examiner ated by traveling or floating dust
WORK VEHICLE

CROSS-REFERENCE TO RELATED APPLICATIONS

This application is the United States national phase of International Application No. PCT/JP2019/023212 filed Jun. 12, 2019, and claims priority to Japanese Patent Application Nos. 2018-119978, 2018-119979, 2018-119980, 2018-119981, and 2018-119982, all filed Jun. 25, 2018, the disclosures of which are hereby incorporated by reference in their entirety.

TECHNICAL FIELD

The present invention relates to a work vehicle that is suitable for travelling on a road surface with many protrusions and recesses (uneven terrain). A work vehicle may be, but is not limited to, a four leg-wheel drive robot.

BACKGROUND ART

Background Art 1

In a conventional configuration, four travel wheels are respectively supported on a vehicle body through link mechanisms that are configured with two joints and are capable of bending/extending operation. Each link mechanism includes an electric motor, a deceleration mechanism and the like, and is capable of driving to bend/extend with the driving force of the electric motor (for example, see Patent Literature 1).

Background Art 2

In a conventional configuration, four travel wheels are respectively supported on a body through link mechanisms that are configured with two joints and are capable of bending/extending operation. Each link mechanism includes an electric motor, a speed reduction mechanism and the like, and is capable of driving to bend/extend with the driving force of the electric motor (for example, see Patent Literature 1).

Background Art 3

In a conventional configuration, four travel wheels are respectively supported on a vehicle body through link mechanisms that are configured with two joints and are capable of bending/extending operation. Each link mechanism is capable of driving to bend/extend with the driving force of the electric motor, and the travel wheels are each individually driven to rotate by the electric motor (for example, see Patent Literature 1).

Background Art 4

In a conventional configuration, four travel wheels are respectively supported on a vehicle body through link mechanisms that are configured with two joints that are swingable about a horizontal axis, and are capable of bending/extending operation. Each link mechanism is capable of driving to bend/extend with the driving force of the electric motor, and each travel wheel is supported such that the orientation thereof in a right-left direction is fixed (for example, see Patent Literature 1).

Background Art 5

In a conventional configuration, four travel wheels are respectively supported on a vehicle body through link mechanisms that are configured with two joints and are capable of bending/extending operation. Each link mechanism is capable of driving to bend/extend with the driving force of the electric motor, and the travel wheels are each individually driven to rotate by the electric motor (for example, see Patent Literature 1).

PRIOR ART DOCUMENT

Patent Literature

Patent Literature 1: JP 9-142347A

SUMMARY OF THE INVENTION

Problems to be Solved by the Invention

Problem 1

A problem corresponding to Background Art 1 is as follows.

With the wheel support structure in the above-described conventional configuration, it is possible to travel with the vehicle body maintained in an appropriate posture while bending and extending the link mechanisms, even when the traveling road surface is uneven. Therefore, it is conceivable to apply such a wheel support structure to an agricultural work vehicle that travels on a work site having protrusions and recesses on the travel road surface. However, the wheel support structure in the above-described conventional configuration has been difficult to adopt in an agricultural work vehicle.

Specifically, with an agricultural work vehicle, a lot of fine dust, such as dust generated by traveling or floating dust generated from the crop due to harvesting work, may be generated in the vicinity of the work vehicle. Also, moisture may adhere due to rain water or morning dew or the like. In the above-described conventional configuration, because the link mechanism for supporting the travel wheels is driven to bend or extend by a built-in electric motor, when fine dust, moisture or the like intrude inside the link mechanism, there is a risk that a malfunction may occur in the electric motor, the deceleration mechanism or the like.

To avoid the above-described disadvantage, it is conceivable to employ a configuration for operating bending link mechanisms using hydraulic cylinders with better water resistance and dust resistance compared to electric motors. When operating the bending link mechanisms using hydraulic cylinders in this way, each of the respective links of the bending link mechanisms require a hydraulic cylinder, and a large number of hydraulic cylinders are required. As a result, the configuration for controlling each hydraulic cylinder may be complex.

Therefore, there has been a demand for a work vehicle that is capable of maintaining an appropriate posture of the vehicle body in work environments where there is a significant risk that fine dust, moisture or the like will intrude, even on a work site with many protrusions and recesses, while employing a control configuration that is as simple as possible.

Problem 2

A problem corresponding to Background Art 2 is as follows.

With the wheel support structure in the above-described conventional configuration, it is possible to travel with the body maintained in an appropriate posture while bending and extending the link mechanisms, even when the travel road surface is uneven. Therefore, it is conceivable to apply such a wheel support structure to an agricultural work vehicle that travels in a farm field, an orchard, a mountainous area or the like, for example. However, the wheel support structure in the above-described conventional configuration has been difficult to adopt in such a work vehicle.

With an agricultural work vehicle, a lot of fine dust, such as dust generated by traveling or floating dust generated from the crop due to harvesting work, may be generated in the vicinity of the work vehicle. Also, moisture may adhere due to rain water or morning dew or the like. In the above-described conventional configuration, because the link mechanism for supporting the travel wheels is driven to bend or extend by a built-in electric motor, when fine dust, moisture or the like intrude inside the link mechanism, there is a risk that a malfunction may occur in the electric motor, the deceleration mechanism or the like.

Therefore, there has been a demand for a work vehicle that is capable of maintaining an appropriate posture of the vehicle body in work environments where there is a significant risk that fine dust, moisture or the like will intrude, even on a work site with many protrusions and recesses, and is also capable of performing location change travel in a stable state with a low center of gravity.

Problem 3

A problem corresponding to Background Art 3 is as follows.

With the wheel support structure in the above-described conventional configuration, it is possible to travel with the vehicle body maintained in an appropriate posture while bending and extending the link mechanisms, even when the traveling road surface is uneven. However, with the above-described conventional configuration, when the work vehicle travels on uneven terrain with many protrusions and recesses, even if one of the travel wheels enters a recess and idles, for example, the link mechanism maintains the posture thereof as it is. Therefore, there is a disadvantage in that the vehicle body is supported by the other travel wheels while the travel wheel is kept in such an idling state for a long time, for example. Thus, there is room for improvement.

Therefore, there has been a demand for a work vehicle that is capable of ensuring that a plurality of travel wheels are in a preferable ground contact drive state even when the work vehicle travels on a work site with many protrusions and recesses while maintaining an appropriate posture.

Problem 4

A problem corresponding to Background Art 4 is as follows.

With the above-mentioned conventional configuration, the work vehicle is capable of travelling in a state where the posture of the vehicle body is stable even on a road surface with many protrusions and recesses, by individually changing the height of each of the plurality of travel apparatuses while bending and extending the link mechanisms. However, each link mechanism is configured to bend and extend by swinging about a horizontal axis, and the orientation of each travel wheel is unchanged despite the height thereof being changed.

As a result, when turning the vehicle body in either the left or right direction, it is necessary to turn the right and left travel wheels by making a difference between the speeds thereof, or change the orientation of the vehicle body by using a robot arm (an articulated manipulator) that is separately provided. With such a configuration, the travel wheels travel while skidding, which is disadvantageous in that turning operation cannot be performed smoothly. In addition, an excessive force may be applied in a lateral direction, which may reduce durability.

Therefore, there has been a demand for a work vehicle that is configured to be capable of smoothly turning the vehicle body without a problem despite the configuration for travelling in a state where the posture of the vehicle body is stable even on a road surface with many protrusions and recesses.

Problem 5

A problem corresponding to Background Art 5 is as follows.

With the above-described conventional configuration, even if the travel road surface has irregularities, it is possible to move over them by bending and extending the bending link mechanisms to change the heights of the travel wheels relative to the vehicle body. However, for example, when it is assumed that the work vehicle is used in an agricultural work area or the like, the work vehicle needs to move over steps such as ridges. With the above-described conventional configuration, intermediate bending portions in which the links of the bending link mechanisms are pivotally coupled to each other protrude outward. Therefore, when the work vehicle travels over steps, the intermediate bending portions may come into contact with the ground and the work vehicle may be unable to move over the steps in a preferable manner.

Therefore, there has been a demand for a work vehicle that is configured to be capable of travelling while maintaining an appropriate posture of the vehicle body even when travelling on a work site with many protrusions and recesses, and also capable of travelling over steps in a preferable manner.

Means for Solving Problems

Solution 1

A solution corresponding to Problem 1 is as follows.

A work vehicle comprising:

a plurality of travel wheels that are respectively located on right and left sides of front and rear portions of a vehicle body;

a plurality of bending link mechanisms that support the plurality of travel wheels on the vehicle body so as to be capable of being individually raised and lowered;

a posture change operation means capable of individually changing postures of the plurality of bending link mechanisms; and a control means for controlling actions of the posture change operation means, wherein each of the bending link mechanisms includes:

a first link that has one end portion that is supported by the vehicle body so as to be pivotable about a horizontal axis, and a second link that has one end portion that is pivotally coupled to the other end portion of the first link so as to be pivotable about a horizontal axis, and the other end portion that supports a travel wheel, the posture change operation means includes:

a first hydraulic cylinder capable of changing a swing posture of the first link relative to the vehicle body, and a second hydraulic cylinder capable of changing a swing posture of the second link relative to the first link, the work vehicle further comprises position detection sensors that detect swing positions of the first links, and pressure sensors that detect pressure of oil chambers of the second hydraulic cylinders, and the control unit is configured to control actions of the first hydraulic cylinders so that the swing positions of the first links equal target positions, based on results of detection performed by the position detection sensors, and control actions of the second hydraulic cylinders so that thrusts have target values, based on results of detection performed by the pressure sensors.

With this configuration, the plurality of travel wheels are supported by bending link mechanisms on the vehicle body so as to be capable of being individually raised and lowered. By changing the postures of the bending link mechanisms using the posture change operation means, it is possible to change the respective heights (relative heights) of the plurality of travel wheels relative to the vehicle body. That is to say, upon the first hydraulic cylinder being operated, the entirety of the bending link mechanism including the first link, the second link, and the travel wheel pivots about the horizontal axis at one end portion of the first link on the vehicle body side, and thus the posture changes. Also, upon the second hydraulic cylinder being operated, the second link and the travel wheel pivots about the horizontal axis at one end portion on the first link side, and thus the posture changes. The swing operation of the first link is mainly used to change the posture of the entire bending link mechanism to a posture that is suitable for a work situation, and the swing operation of the second link is mainly used to raise or lower the travel wheel during task travel.

In this way, an operation to change the posture of each bending link mechanism is performed using a hydraulic cylinder, and even if fine dust, moisture or the like falls on the hydraulic cylinder, the hydraulic cylinder is less likely to be adversely affected or cause a malfunction or the like for such a reason.

When the work vehicle is to travel on a work site with many protrusions and recesses, for example, target positions of the swing positions of the first links are set in advance so that the posture of the vehicle body can be kept at a predetermined posture, and the actions of the first hydraulic cylinders are controlled based on the results of detection performed by the position detection sensors. On the other hand, the second hydraulic cylinders are used to change the postures of the second links that are each provided with a travel wheel that is to be grounded, at a leading end thereof. The thrust of each second hydraulic cylinder is equivalent to the force resisting the ground reaction force applied to the travel wheel from the ground. The ground reaction force is small when there is a recess in the ground and the travel wheel is raised from the ground, becomes small, and the ground reaction force is large when the travel wheel travels over a protrusion on the ground. Such a change in the ground reaction force is detected by the pressure sensors, and the actions of the second hydraulic cylinders are controlled so that the thrusts detected based on the detection results of the pressure sensors have the target values. Thus, the ground reaction force of the travel wheels are maintained at an appropriate value. As a result, the travel wheels move up and down while following the protrusions and recesses of the ground and keep an appropriate state of contact with the ground, and the work vehicle can desirably travel on an uneven terrain with the vehicle body being supported by the plurality of travel wheels so as to be maintained in an appropriate state of contact with the ground.

By the way, in order to maintain an appropriate state of contact with the ground, instead of the above-described configuration, it is possible to employ a configuration in which not only the second hydraulic cylinders but also the first hydraulic cylinders are provided with pressure sensors in addition to the position detection sensors so that position control and pressure control can be performed in combination. However, in such a configuration, the number of pressure sensors is large, the number of parts is large, the configuration is complex, and the control configuration is also complicated, which is disadvantageous in that costs increase. In contrast, with the above-described configuration, it is possible to reduce the number of pressure sensors as much as possible to simplify the configuration, simplify the control configuration, and reduce costs.

Therefore, it is possible to provide a work vehicle that is capable of maintaining an appropriate posture of the vehicle body in work environments where there is a significant risk that fine dust, moisture or the like will intrude, even on a work site with many protrusions and recesses, while employing a control configuration that is as simple as possible.

In one preferable embodiment, each of the plurality of travel wheels is provided with a hydraulic motor that drives and rotates the travel wheel.

With this configuration, the travel wheels are driven by hydraulic motors. Compared to electric motors and the like, hydraulic motors are more likely to prevent moisture and dust from entering the inside thereof even if they adhere to the surface, and accordingly hydraulic motors are less likely to be adversely affected or cause a malfunction or the like for such a reason.

Instead of hydraulic motors, for example, a mechanical power transmission mechanism such as a power transmission chain may be used to drive the travel wheels. However, with such a configuration, it is necessary to provide a power transmission mechanism that can transmit power while allowing the bending operations of the bending link mechanisms, along the bending link mechanisms, between a drive source such as an engine provided in the vehicle body and the travel wheels. Thus, the structure is complex. In contrast, with the present configuration, the structure is simpler than such a mechanical power transmission structure.

In one preferable embodiment, an auxiliary wheel is provided in a portion where the first link and the second link are pivotally coupled to each other.

With this configuration, in a state where the bending link mechanisms are bent upward and the travel wheels are retracted, when the work vehicle is discharged from a loading platform of a truck, for example, the auxiliary wheels first come into contact with the ground, and absorb the impact when the work vehicle is grounded, to prevent the vehicle body from being damaged. Also, in a state where the plurality of bending link mechanisms are bent upward and the travel wheels are raised, when the auxiliary wheels are grounded, the work vehicle can be easily moved through manual operations.

Solution 2

A solution corresponding to Problem 2 is as follows.

A work vehicle comprising:

a vehicle body that is provided with a base;

a plurality of travel wheels that are respectively located on right and left sides of front and rear portions of the vehicle body;

a plurality of bending link mechanisms that support the plurality of travel wheels on the vehicle body so as to be capable of being individually raised and lowered;

a posture change operation means of a hydraulic operation type, capable of individually changing postures of the plurality of bending link mechanisms; and a hydraulic supplier that feeds out hydraulic oil to the posture change operation means, wherein the hydraulic supplier is provided below the base of the vehicle body.

With this configuration, it is possible to change the height of each of the plurality of travel wheels relative to the vehicle body by changing the posture of each bending link mechanism using the posture change operation means. Therefore, even when the work vehicle travels on a road with protrusions and recesses, the work vehicle can travel in a state where the vehicle body is maintained in an appropriate posture, while being stably grounded and supported by the plurality of travel wheels.

The posture change operation means are of a hydraulic operation type, and generally have better waterproof and dustproof properties compared to those of an electric type. Therefore, even if moisture or dust adheres to the surfaces, the posture change operation means are less likely to be adversely affected or cause a malfunction or the like for such a reason. Therefore, even in a work environment where fine dust, moisture or the like may enter, it is possible to desirably perform posture change operations.

A work vehicle with the hydraulic operation type posture change operation means requires a hydraulic supplier for supplying hydraulic oil to the posture change operation means, and the hydraulic supply supplier includes a drive device such as an engine or an electric motor, and a hydraulic pump or the like driven by the drive device. A hydraulic supplier that includes a large device such as an engine or an electric motor is a large device, and has a relatively large weight. Such a large and heavy hydraulic supplier is provided in a state of being located below the base of the vehicle body.

As described above, the hydraulic supplier, which is a heavy device, is provided below the base, i.e., in the underpart of the vehicle body, and therefore the center of gravity of the vehicle body is located at a low position. That is to say, when travelling on a work site with many protrusions and recesses, the work vehicle can perform location change travel in a stable state with a low center of gravity, by lowering the position of the center of gravity of the vehicle body as much as possible.

Therefore, the work vehicle can maintain an appropriate posture of the vehicle body in work environments where there is a significant risk that fine dust, moisture or the like will intrude, even on a work site with many protrusions and recesses, and can also perform location change travel in a stable state with a low center of gravity.

In one preferable embodiment,
a supporting frame that supports the hydraulic supplier is coupled to a lower portion of the base, and
the supporting frame is configured to be attachable to the base and detachable from the base by moving the supporting frame in a lateral direction of the vehicle body in a state of supporting the hydraulic supplier.

With this configuration, it is possible to stably support the hydraulic supplier, using the support frame that is connected to the base and has sufficient support strength. Also, it is possible to attach/remove the supporting frame to/from the base by moving the supporting frame in a lateral direction of the vehicle body. Therefore, it is possible to more easily perform work to attach or remove the supporting frame compared to the configuration with which the hydraulic supplier needs to be separately attached to or removed from the vehicle body in a narrow area under the vehicle body. Furthermore, it is possible to remove the hydraulic supplier from the vehicle body to perform maintenance work such as inspection and repair in an easy-to-work state.

In one preferable embodiment, the support frame is configured to be able to maintain a posture of the entire vehicle body with a lower end portion thereof being in contact with the ground.

With this configuration, when holding the position of the work vehicle in a state of being stopped, it is possible to support the work vehicle so as to be in contact with the ground, in a state of being prevented from moving while keeping the posture of the entire vehicle body unchanged, by changing the postures of the bending link mechanisms such that the plurality of travel wheels are raised from the ground, and bringing the supporting frame into contact with the ground.

In one preferable embodiment, the hydraulic supplier includes an engine and a hydraulic pump that is driven by the engine.

With this configuration, it is possible to supply a sufficient amount of hydraulic oil to the posture change operating means by driving the hydraulic pump using large power of the engine, and smoothly and quickly perform a posture change operation.

In one preferable embodiment,
each of the bending link mechanisms includes:
a first link that has one end portion that is supported by the base so as to be pivotable about a horizontal axis, and
a second link that has one end portion that is supported by the other end portion of the first link so as to be pivotable about a horizontal axis, and the other end portion that supports a travel wheel, and
the posture change operation means includes:
a first hydraulic cylinder capable of changing a swing posture of the first link relative to the base, and
a second hydraulic cylinder capable of changing a swing posture of the second link relative to the first link.

With this configuration, each bending link mechanism is formed by coupling the first link and the second link so as to be rotatable about a horizontal axis, and the swing posture of the first link relative to the vehicle body is changed using the first hydraulic cylinder, and the swing posture of the second link relative to the first link is changed using the second hydraulic cylinder, and thus the posture of the bending link mechanism is changed. With such a configuration in which the swing postures of two links that are pivotally coupled to each other are individually changed by two hydraulic cylinders, it is possible to smoothly perform a posture change operation.

Solution 3

A solution corresponding to Problem 3 is as follows.
A work vehicle comprising:
a plurality of travel wheels that are respectively located on right and left sides of front and rear portions of a vehicle body;
a plurality of travel drive devices that individually drive the plurality of travel wheels;
raising/lowering support mechanisms that support the plurality of travel wheels on the vehicle body so as to be capable of being individually raised and lowered;
a plurality of posture change operation means capable of individually changing postures of the plurality of raising/lowering support mechanisms;
a control means for controlling actions of the posture change operation means; and
idling state detection means for detecting whether or not the travel wheels are in an idling state,
wherein the control means is configured to, upon the idling state detection means detecting that a travel wheel is in an idling state, control actions of the posture change operation means so that a raising/lowering support mechanism lowers the travel wheel.

With this configuration, even when travelling on a work site with many protrusions and recesses such as an uneven terrain, the work vehicle can travel while maintaining an appropriate posture by individually raising or lowering the plurality of travel wheels relative to the vehicle body, using the raising/lowering support mechanisms. Also, when the work vehicle travels on a work site with many protrusions and recesses by individually driving the plurality of travel wheels using the plurality of travel drive devices, if an idling state detection means detects that a travel wheel is in an idling state, the action of the posture change operation means is controlled so that the travel wheel is lowered.

An idling state of a travel wheel may be, for example, a state in which the travel wheel enters a recess in the ground and is raised, or a state in which the travel wheel idles because the road surface is slippery even though the travel wheel is in contact with the ground. Therefore, in such a case, the travel wheel is lowered and grounded such that the drive force thereof can be transmitted to the ground. As a result, it is possible to prevent the travel wheels from continuously idling and ensure a preferable ground contact drive state even when the work vehicle travels on a work site with many protrusions and recesses while maintaining an appropriate posture.

In one preferable embodiment,
the travel drive devices includes a hydraulic motor, and
the idling state detection means includes:
a pressure sensor that detects an internal pressure of a hydraulic oil supply path in the hydraulic motor, and
a determination means for determining that the travel wheel is in an idling state upon the internal pressure falling below a preset value, based on information detected by the pressure sensor.

With this configuration, the travel wheels are driven by hydraulic motors. Hydraulic motors have better waterproof and dustproof properties compared to electric motors, and, for example, even in a work environment in which there is a lot of fine dust, such as dust generated by traveling or floating dust generated from the crop, hydraulic motors are less likely to be adversely affected or cause a malfunction or the like for such a reason.

With the configuration in which the travel wheels are driven by hydraulic motors, if a travel wheel idles, the internal pressure of the hydraulic oil supply path is lower than that in an appropriate drive state. Therefore, by utilizing this fact, when the internal pressure detected by the pressure sensor falls below a preset value, it is determined that the vehicle wheel is idling.

Therefore, even if fine dust, moisture or the like falls on the hydraulic motors, the hydraulic motors are less likely to be adversely affected or cause a malfunction or the like for such a reason, and an idling state can also be easily detected.

In one preferable embodiment,
the idling state detection means includes:
a drive speed detection means for detecting a drive speed of the travel drive device,
a travel speed detection means for detecting an actual travel speed of the vehicle body, and
a determination means for determining that the vehicle wheel is in an idling state when the drive speed of the travel drive device detected by the drive speed detection means is greater than the actual travel speed detected by the travel speed detection means, by a preset amount or more.

With this configuration, if the drive speed of a travel drive device is greater than the actual travel speed of the vehicle body, it is likely that the travel wheels is idling. Therefore, the drive speed and the actual speed are detected using the drive speed detection means and the travel speed detection means, and if the drive speed is higher than the actual travel speed by a present amount or more, it can be determined that the travel wheel driven by the travel drive device is idling.

Therefore, by comparing the speed of the travel wheel and the actual speed of the vehicle body, it is possible to reliably determine whether or not the travel wheel is in an idle state.

Solution 4
A solution corresponding to Problem 4 is as follows.
A work vehicle comprising:
a plurality of travel wheels that are respectively located on right and left sides of front and rear portions of a vehicle body;
a plurality of bending link mechanisms that support the plurality of travel wheels on the vehicle body so as to be capable of being individually raised and lowered;
a posture change operation means capable of individually changing postures of the plurality of bending link mechanisms;
a plurality of turning operation means for respectively supporting the plurality of bending link mechanisms on the vehicle body such that orientations thereof can be changed about vertical axes; and
a control means for controlling actions of the posture change operation means and the turning operation means,
wherein the control means is configured to, when performing an operation change orientation on either the front right and left travel wheels or the rear right and left travel wheels, control an action of the posture change operation means so that a position of a center of gravity of the vehicle body moves toward a side opposite to a side to which the orientation change operation is performed, in a front-rear direction of the vehicle body.

With this configuration, even when the work vehicle travels on a road with protrusions and recesses, the work vehicle can travel in a state where the vehicle body is maintained in an appropriate posture by changing the postures of the plurality of bending link mechanisms to individually raise or lower the plurality of travel wheels relative to the vehicle body. Also, by changing the orientations of the bending link mechanisms about vertical axes, it is possible to change the orientations of the travel wheels relative to the vehicle body in the right-left direction. When turning the vehicle body in either the left or right direction, it is possible to drive the travel wheels to travel without applying excessive force thereto, by changing the orientations of the travel wheels toward the turning direction.

When an orientation change operation is performed on the front right and left travel wheels and the vehicle body turns during travel, the posture change operation means works such that the position of the center of gravity of the vehicle body moves toward the side opposite to the side to which the orientation change operation is performed, i.e., toward the rear side of the vehicle body. When an orientation change operation is performed on the rear right and left travel wheels and the vehicle body turns, the posture change operation means works such that the position of the center of gravity of the vehicle body moves toward the front side of the vehicle body.

Although the load of the vehicle body applied to the travel wheels on the side that is opposite to the side to which the orientation is changed increases, the load of the vehicle body applied to the travel wheels on the side to which the orientation is changed decreases. As a result, it is possible to reduce the reaction force from the ground applied to the travel wheels on the side to which the orientation is changed, and thus the orientation change operation can be smoothly performed.

Therefore, the work vehicle can smoothly turn the vehicle body without a problem despite the configuration for travelling in a state where the posture of the vehicle body is stable even on a road surface with many protrusions and recesses.

In one preferable embodiment, the control means is configured to control an action of the posture change operation means such that the bending link mechanisms located on a side, to which an orientation change operation is performed in a front-rear direction of the vehicle body, move the vehicle body away from the travel wheels that are supported by the bending link mechanisms and are in contact with the ground, and the control means is configured to control an action of the posture change operation means such that the bending link mechanisms located opposite to the side to which the orientation change operation is performed in the front-rear direction of the vehicle body move the vehicle body closer to the travel wheels that are supported by the bending link mechanisms and are in contact with the ground.

With this configuration, the vehicle body moves upward away from the travel wheels that are grounded, on the side to which the orientation change operation is performed. On the other hand, the vehicle body moves downward closer to the travel wheels that are grounded, on the side that is opposite to the side to which the orientation change operation is performed. As a result, the vehicle body is inclined in the front-rear direction such that the side to which the orientation change operation is performed is located on the upper side, and the side that is opposite to the side to which the orientation change operation is performed is located on the lower side. That is to say, the vehicle body is inclined in the front-rear direction such that a part on the side to which the orientation change operation is performed is located on the upper side. As a result of the vehicle body being inclined in the front-rear direction in this way, the position of the center of gravity of the vehicle body moves downward.

In addition, when the vehicle body is inclined in the front-rear direction, the load of the vehicle body applied to the travel wheels on the side to which the orientation change operation is performed is less than the load equally applied when the vehicle body is in the horizontal posture. That is to say, if the posture of the vehicle body is the horizontal posture in the front-rear direction, the load is equally applied to the front travel wheels and the rear travel wheels, whereas, if the vehicle body is inclined in the front-rear direction, the load is concentrated to the bending link mechanisms on the side that is opposite to the side to which the orientation change operation is performed, and accordingly the load applied to the bending link mechanisms on the side to which the orientation change operation is performed decreases. As a result, it is possible to further reduce the load applied from the ground to the travel wheels on the side to which the orientation is changed.

In one preferable embodiment, each of the bending link mechanisms includes:

a first link that has one end portion that is supported by a base so as to be pivotable about a horizontal axis, and a second link that has one end portion that is supported by the other end portion of the first link so as to be pivotable about a lateral axis, and the other end portion that supports a travel wheel, and each of the turning operation means includes:

a turning support portion that supports the first link on the vehicle body such that an orientation thereof can be changed about the vertical axis, and a turning operation hydraulic cylinder that performs an operation to integrally change orientations of the first link and the second link about the vertical axis.

With this configuration, it is possible to change the height of a travel wheel relative to the vehicle body by changing the swing posture of the first link relative to the vehicle body and the swing posture of the second link relative to the first link. The first link, the second link, and the travel wheel supported by the second link are integrally supported by the pivot support portion on the vehicle body so as to be pivotable about a vertical axis.

Even if the first link, the second link, and the travel wheel are operated to pivot about the vertical axis, their relative postures are invariably kept unchanged. Therefore, it is possible to perform an operation to change the height of the travel wheel relative to the vehicle body by changing the bending link mechanism regardless of the position to which they are pivoted about the vertical axis.

Therefore, it is possible to smoothly perform a turning operation and a raising/lowering operation relative to the vehicle body regarding each of the plurality of travel wheels.

Solution 5

A work vehicle comprising:

a plurality of travel wheels that support a vehicle body and are driven to travel;

a plurality of bending link mechanisms that support the plurality of travel wheels on the vehicle body so as to be capable of being individually raised and lowered;

a posture change operation means capable of individually changing postures of the plurality of bending link mechanisms;

auxiliary wheels that are respectively supported by intermediate bending portions of the plurality of bending link mechanisms; and travel drive devices that drive and rotate the travel wheels and the auxiliary wheels.

With this configuration, it is possible to change the height (relative height) of each of the plurality of travel wheels relative to the vehicle body by changing the posture of each bending link mechanism using the posture change operation means. Therefore, even when the work vehicle travels on a road with protrusions and recesses, the work vehicle can travel in a state where the vehicle body is maintained in an appropriate posture, while being stably grounded and supported by the plurality of travel wheels.

When a bending link mechanism is bent and extended so that the travel wheel rides on the upper side of a step or moves over a ridge to travel to the other side of the ridge, even if the intermediate bending portion of the bending link mechanism approaches the ground, the auxiliary wheel supported by the intermediate bending portion comes into contact with the ground and rotates to guide the work vehicle.

The auxiliary wheel is driven to rotate by a traveling drive device as with the travel wheel, the auxiliary wheel can easily ride on the upper side of the step of the ground and travel using the rotational power of the auxiliary wheel. In a state where the rotation of the auxiliary wheel has been stopped, if a wheel skids when travel over a step, the auxiliary wheel may hinder the travel. However, the auxiliary wheel is driven to rotate and forcibly rides on the step. Therefore, the work vehicle is free from the disadvantage in which the intermediate bending portion of the bending link mechanism comes into contact with the ground and gets caught, and it is possible to guide the work vehicle to smoothly travel over the step.

Therefore, the work vehicle can travel while maintaining an appropriate posture of the vehicle body even when travelling on a work site with many protrusions and recesses, and can also travel over steps in a preferable manner.

In one preferable embodiment,
the travel drive devices are individually provided for the plurality of bending link mechanisms, and
the travel drive devices include hydraulic motors that drive the travel wheels and the auxiliary wheels of the bending link mechanisms.

With this configuration, the travel wheels and the auxiliary wheel are driven by one hydraulic motor provided for the bending link mechanism. Instead of this configuration, it is possible to separately provide a dedicated hydraulic motor for driving the auxiliary wheel in addition to the hydraulic motor for the travel wheel. However, it is possible to realize a simpler configuration than such a configuration by using a hydraulic motor for both wheels. Also, compared to electric motors and the like, hydraulic motors are more likely to prevent moisture and dust from entering the inside thereof even if they adhere to the surface, and accordingly hydraulic motors are less likely to be adversely affected or cause a malfunction or the like for such a reason.

In one preferable embodiment, the travel drive devices are located between the intermediate bending portions of the bending link mechanisms and support portions of the travel wheels.

With this configuration, for example, there are less restrictions regarding installation of the travel drive devices compared with the configuration in which the travel drive devices are integrally connected to the axles of the travel wheels or the axles of the auxiliary wheels, and the travel drive devices may be located away from the ground surface. Therefore, it is possible to reduce the risk of the travel drive devices coming into contact with the ground when travelling over steps, ridges or the like.

In one preferable embodiment,
each of the bending link mechanisms includes:
a first link that has one end portion that is supported by a base so as to be pivotable about a horizontal axis, and
a second link that has one end portion that is supported by the other end portion of the first link so as to be pivotable about a lateral axis, and the other end portion that supports a travel wheel,
the posture change operation means includes:
a first hydraulic cylinder capable of changing a swing posture of the first link relative to the vehicle body, and
a second hydraulic cylinder capable of changing a swing posture of the second link relative to the first link, and
the auxiliary wheel is supported on a portion where the first link and the second link are pivotally coupled to each other.

With this configuration, it is possible to raise and lower a travel wheel relative to the vehicle body by changing the swing posture of the first link relative to the vehicle body and the swing posture of the second link relative to the first link. Also, an auxiliary wheel is supported on a portion where the first link and the second link are pivotally coupled to each other. Therefore, even if the portion where the first link and the second link are pivotally coupled to each other approaches the ground as a result of a raising/lowering operation of the travel wheel, the auxiliary wheel comes into contact with the ground and is smoothly guided. Also, it is possible to use the support shaft for pivotally coupling the first link and the second link as the support shaft of the auxiliary wheel, and it is possible to simplify the support structure.

The bending link mechanism is operated to change the posture thereof by two hydraulic cylinders. Hydraulic cylinders are generally more likely to prevent moisture, fine dust and the like from entering the inside, and even if moisture and dust adhere to the surfaces thereof, hydraulic cylinders can prevent them from entering the inside. Therefore, hydraulic cylinders are less likely to be adversely affected or cause a malfunction or the like for such a reason. Therefore, even in a work environment where fine dust, moisture or the like may enter, it is possible to desirably perform posture change operations.

Other characteristic configurations and advantages produced thereby will be apparent from the following description.

DESCRIPTION OF EMBODIMENTS

In each embodiment to be described below, the front-rear direction of the vehicle body is defined in the direction of travel of the vehicle body, and the right-left direction of the vehicle body is defined in a state where the vehicle body is seen in the direction of travel of the machine body. That is to say, the direction indicated by a mark (A) in FIG. 1 is the front-rear direction of the vehicle body and the direction indicated by a mark (B) in FIG. 2 is the right-left direction of the vehicle body.

First Embodiment

Figure 1:
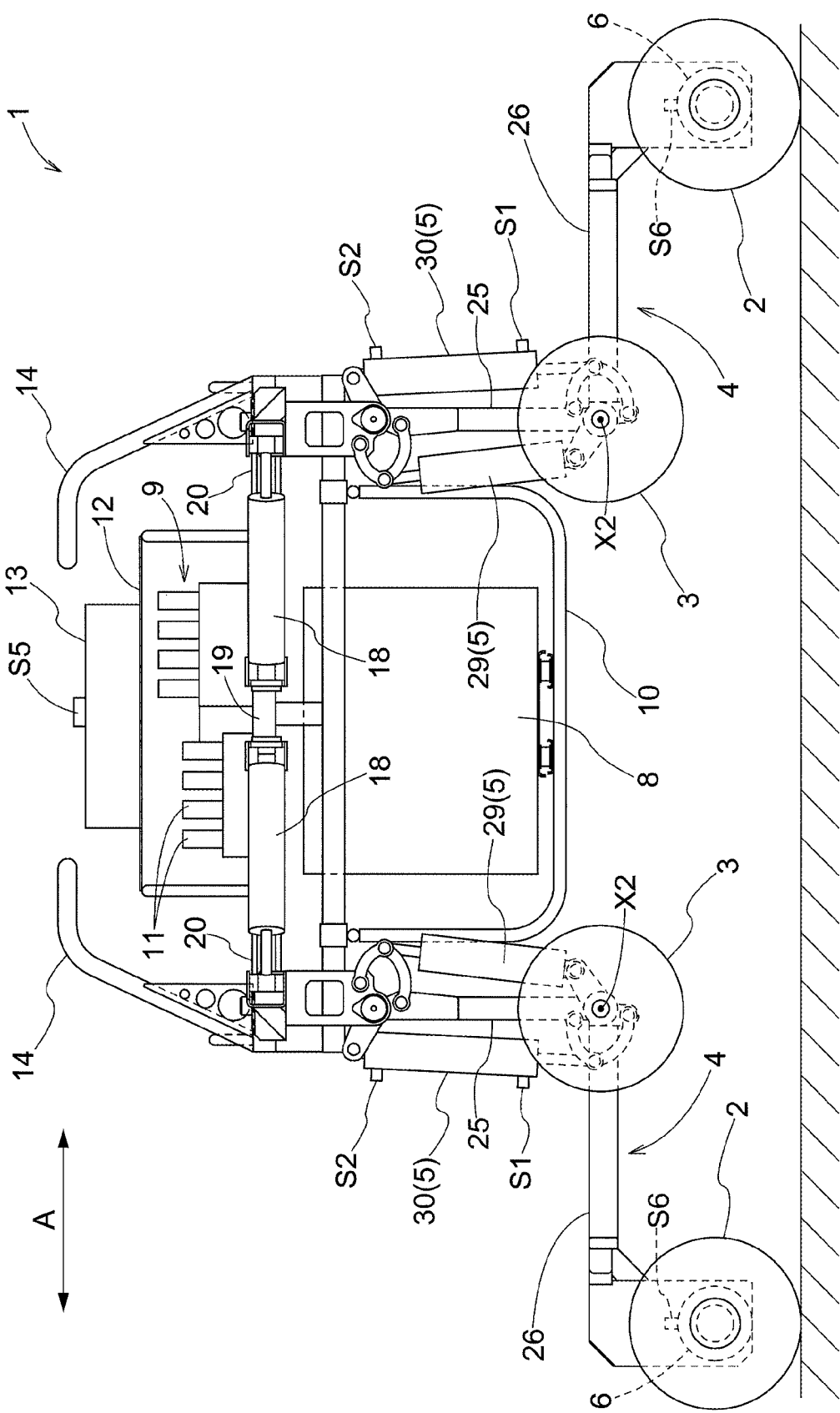
FIG. 1 shows a first embodiment (the same applies up to FIG. 16) and is an overall side view of a work vehicle.
Figure 2:
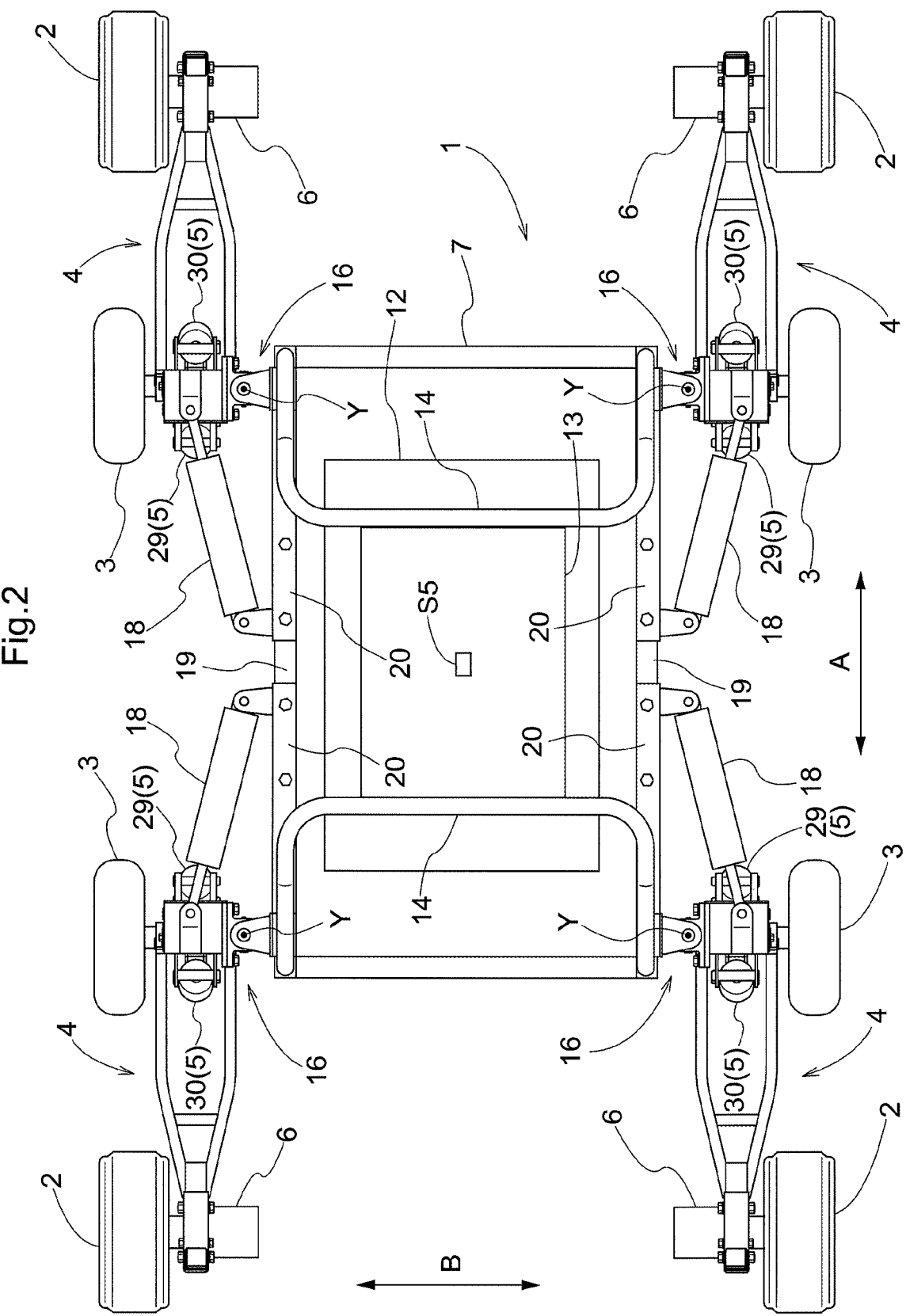
FIG. 2 is an overall plan view of the work vehicle.

As shown in FIGS. 1 and 2, the work vehicle includes: a vehicle body 1 that has a substantially rectangular shape in plan view and supports the entire vehicle; a plurality of (specifically, four) travel wheels 2; a plurality of auxiliary wheels 3 that are provided in correspondence to the plurality of travel wheels 2, respectively; bending link mechanisms 4 (examples of vehicle body support mechanisms) that support the plurality of travel wheels 2 on the vehicle body 1 such that the positions thereof can be individually changed; posture change operation means 5 that are hydraulically driven and can perform change operation on the bending link mechanisms 4; and a plurality of hydraulic motors 6 that respectively drive the plurality of travel wheels 2. A pair of right and left bending link mechanisms 4, a pair of right and left travel wheels 2 and a pair of right and left auxiliary wheels 3 are provided on both front side and rear side of the vehicle body 1.

The vehicle body 1 is provided with: a vehicle body frame 7 that has a frame shape and supports the entire vehicle body 1; a hydraulic supplier 8 that feeds out hydraulic oil to the posture change operation means 5; and a valve mechanism 9 that controls hydraulic oil to be supplied from the hydraulic supplier 8 to the posture change operation means 5. Although not described in detail, the hydraulic supplier 8 is provided with an engine and a hydraulic pump that is driven by the engine, which are integrally coupled to each other. The hydraulic supplier 8 is mounted on and supported by a support frame (support base) 10 that is coupled to a lower portion of the vehicle body frame 7 so as to be located in the underpart of the vehicle body 1. The hydraulic supplier 8 feeds out and supplies hydraulic oil to the posture change operation means 5 via the valve mechanism 9, using the hydraulic pump driven by the engine. Although not shown in the drawings, it is possible to laterally slide the hydraulic supplier 8 and the support frame 10 coupled to each other as a single body and remove them from the vehicle body 1 by removing the support frame 10 from the vehicle body frame 7, and it is possible to laterally slide them and attach them again by attaching the supporting frame 10 to the vehicle body frame 7.

Figure 14:
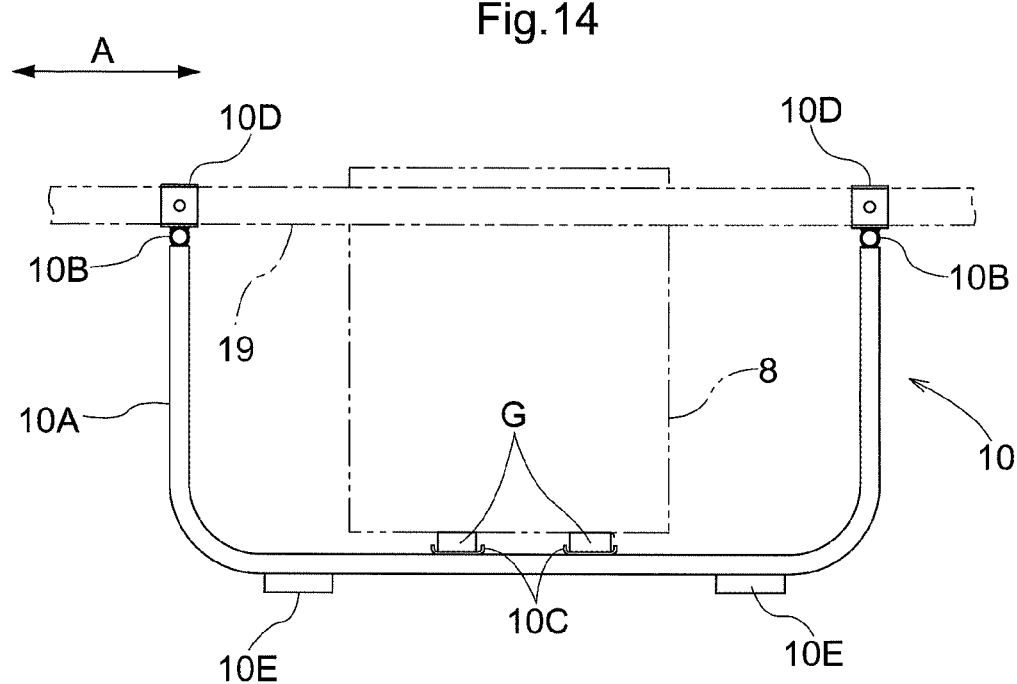
FIG. 14 is a side view of a supporting frame.
Figure 15:
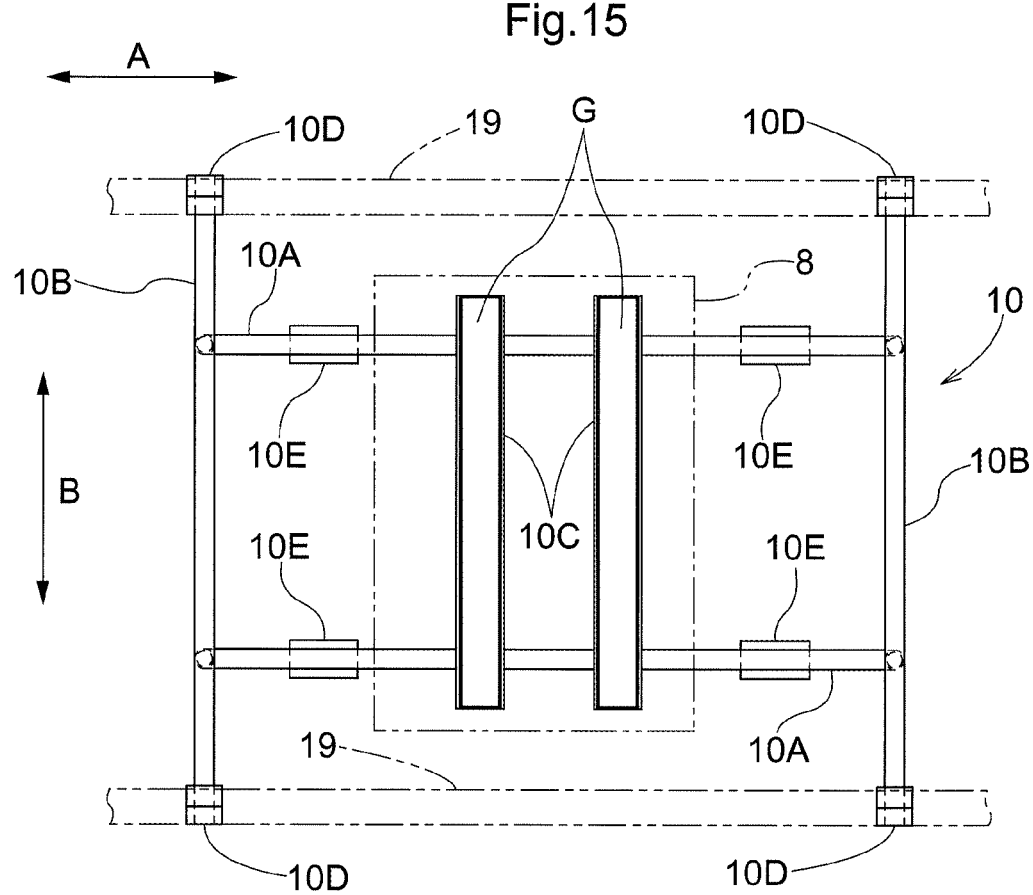
FIG. 15 is a plan view of the supporting frame.
Figure 16:
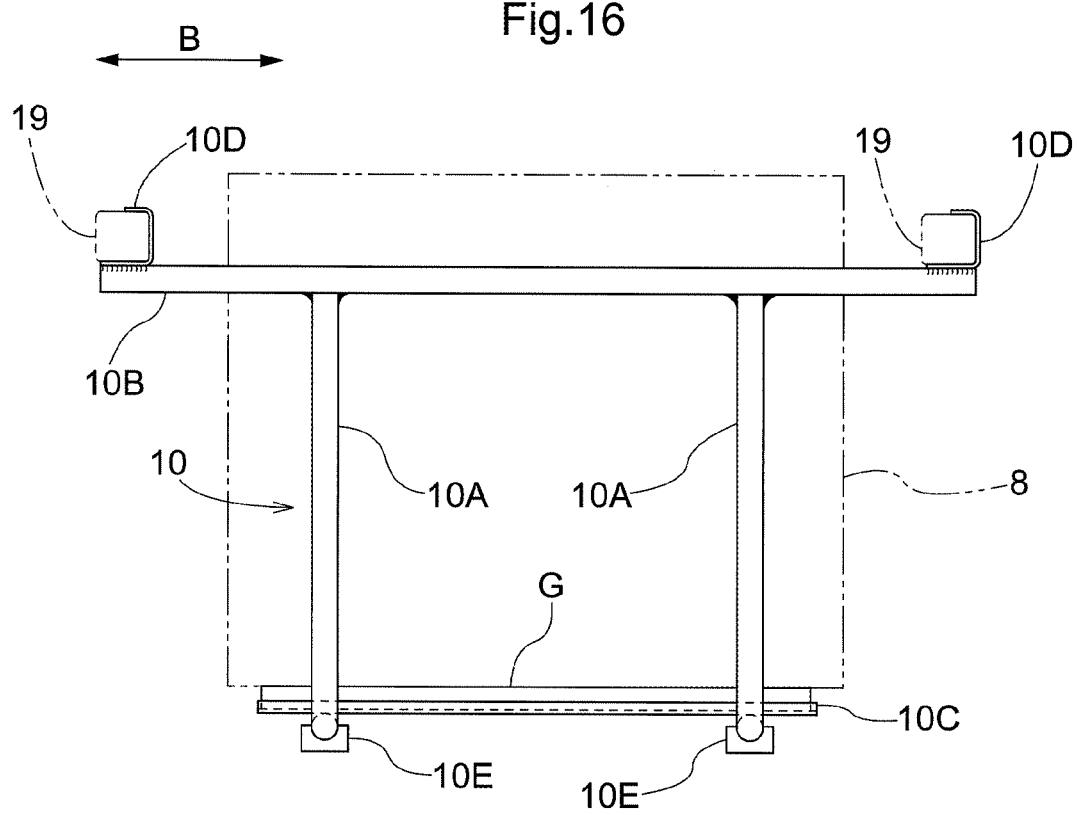
FIG. 16 is a front view of the supporting frame.

More specifically, as shown in FIGS. 14, 15 and 16, the support frame 10 is formed into a framework by integrally coupling: a pair of right and left bottom receiver members 10A that are each formed by bending a round pipe into a substantially U-like shape in a side view; and a pair of front and rear lateral support members 10B that are each formed of a round pipe member, couple the respective front end portions and the respective rear end portions of the bottom receiver members 10A, and extend in both right and left directions. A pair of front and rear engine support members 10C are mounted on and bolted to the right and left bottom receiver members 10A such that each engine support member 10C bridges between them.

Coupling brackets 10D that are made of a channel material and open sideways are coupled to upper portions of right and left end portions of the pair of front and rear lateral support members 10B. The right and left coupling brackets 10D open in the same direction, and are configured to be laterally attached to and bolted, from one direction, to square tubular shaped front-rear frame members 19 that are provided at right and left lateral side positions of the vehicle body frame 7 of the vehicle body 1. Also, ground-engaging support members 10E that support the vehicle body 1 in a state of being in contact with the ground in a non-slip state are provided on lower portions of the pair of bottom receiver members 10A. Therefore, the support frame 10 is configured to be able to maintain the posture of the entire vehicle body with a lower end portion thereof being in contact with the ground.

The hydraulic supplier 8 is configured by integrally coupling the engine and the hydraulic pump with each other, and the hydraulic supplier 8 is mounted on and supported by the front and rear engine support members 10C with vibration-proof rubbers G interposed therebetween. The hydraulic supplier 8 is disposed so as to be housed in a lower portion of the vehicle body frame 7.

It is possible to laterally slide the hydraulic supplier 8 and remove it from the vehicle body 1 by removing the support frame 10 from the vehicle body frame 7 in the state of supporting the hydraulic supplier 8, and it is possible to laterally slide the hydraulic supplier 8 and attach it again by attaching the supporting frame 10 to the vehicle body frame 7.

The valve mechanism 9 is provided in the state of being mounted on and supported by an upper portion of the vehicle body frame 7, and includes a plurality of hydraulic control valves 11 for supplying/discharging hydraulic oil to/from the posture change operation means 5 or adjusting the flow rate, for example. The valve mechanism 9 is covered by a storage case 12 from above. A control device 13 (an example of a control means) for controlling the action of the valve mechanism 9 is provided above the storage case 12.

Exterior frames 14 for protecting the valve mechanism 9 stored in the storage case 12, the control device 13 provided above and so on when the vehicle body 1 falls over, are provided above the vehicle body frame 7. The exterior frames 14 are provided respectively on front and rear sides, and are each formed by bending a rod-shaped member into a substantially U-like shape in plan view and a substantially L-like shape in a side view, and right and left end portions thereof are attached and fixed to front and rear end portions of the vehicle body frame 7. The front and rear exterior frames 14 are provided such that their respective upper portions are located close to each other, and are shaped so as to cover outer peripheral portions of the valve mechanism 9, the control device 13 and so on.

Figure 8:
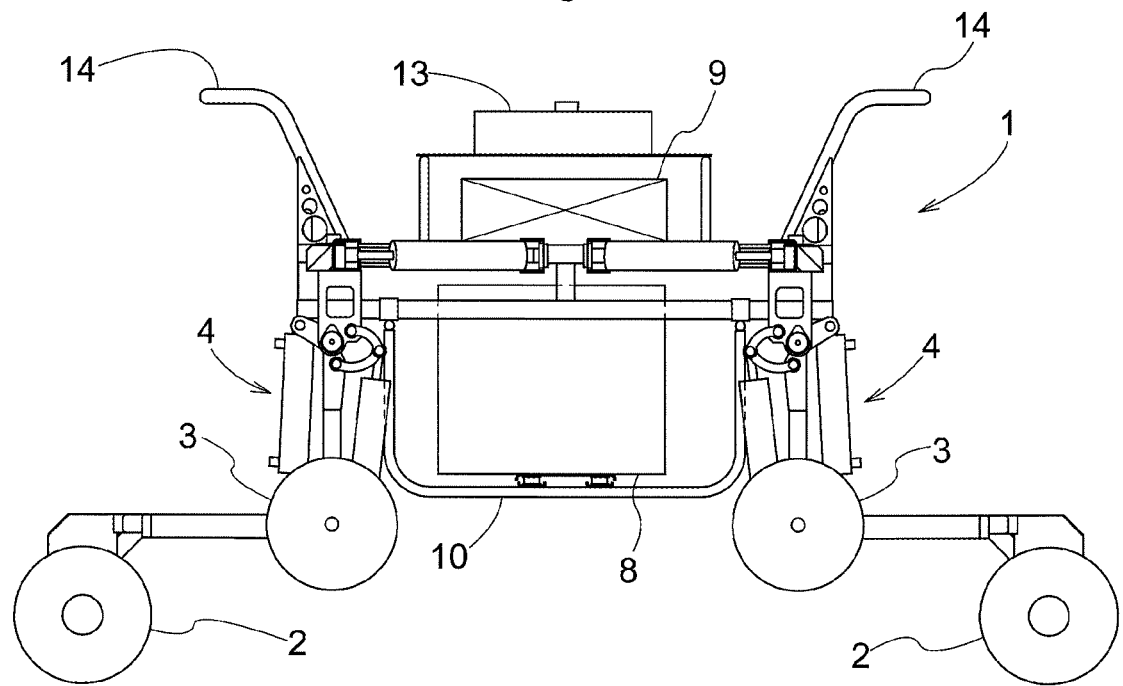
FIG. 8 is a side view when an attachment state of an exterior frame is changed.
Figure 9:
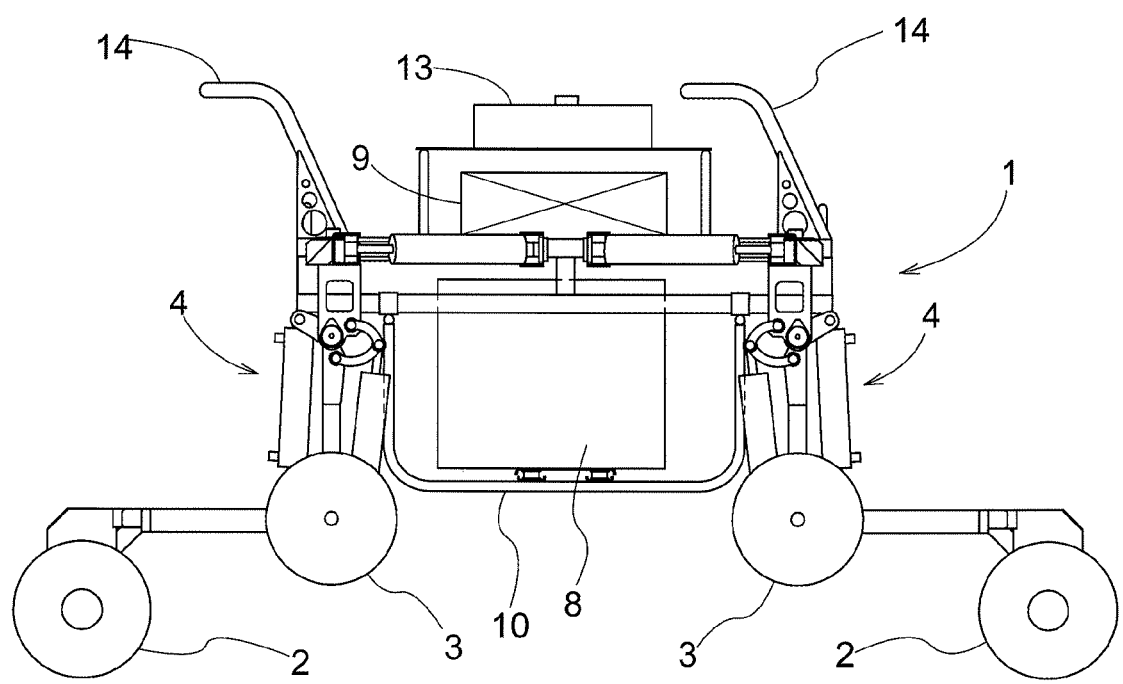
FIG. 9 is a side view when the attachment state of the exterior frame is further changed.

As shown in FIG. 8, the work vehicle can be used as a cart for carrying baggage when the front and rear exterior frames 14 are attached such that upper portions thereof extend outward in the front-rear direction, and a mounting plate that is elongated in the front-rear direction is placed above the exterior frames 14. Also, as shown in FIG. 9, the exterior frames 14 can be used as handles to be held by the operator's hands when the exterior frames 14 are attached such that upper portions thereof extend in one way in the front-rear direction.

Next, a support structure for supporting the travel wheels 2 on the vehicle body 1 will be described.

The plurality of (specifically, four) travel wheels 2 are supported on the vehicle body 1, using the bending link mechanisms 4 so as to be capable of being individually raised or lowered. Each bending link mechanism 4 is supported on the vehicle body frame 7 using a turning mechanism 16 (an example of a turning operation means) so as to be pivotable about a vertical axis Y.

The turning mechanism 16 is provided with: a vehicle body-side support portion 17 (see FIGS. 3 and 4; an example of a turning support portion) that is coupled to the vehicle body frame 7 and supports the bending link mechanisms 4 so as to be pivotable; and a turning hydraulic cylinder (hereinafter referred to as a turning cylinder) 18 for allowing the bending link mechanism 4 to be operated to turn.

Figure 3:
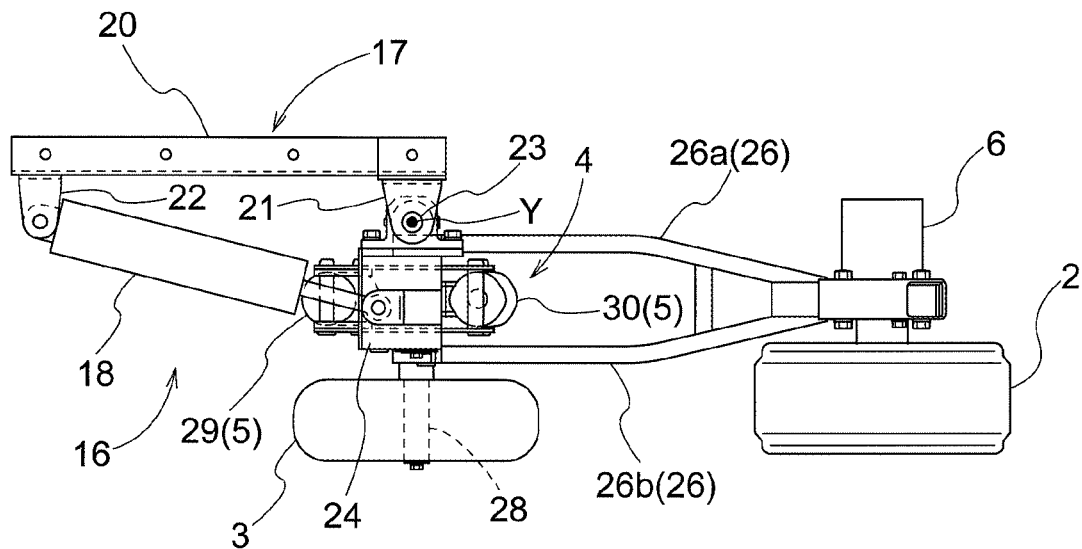
FIG. 3 is a plan view of a bending link mechanism.
Figure 4:
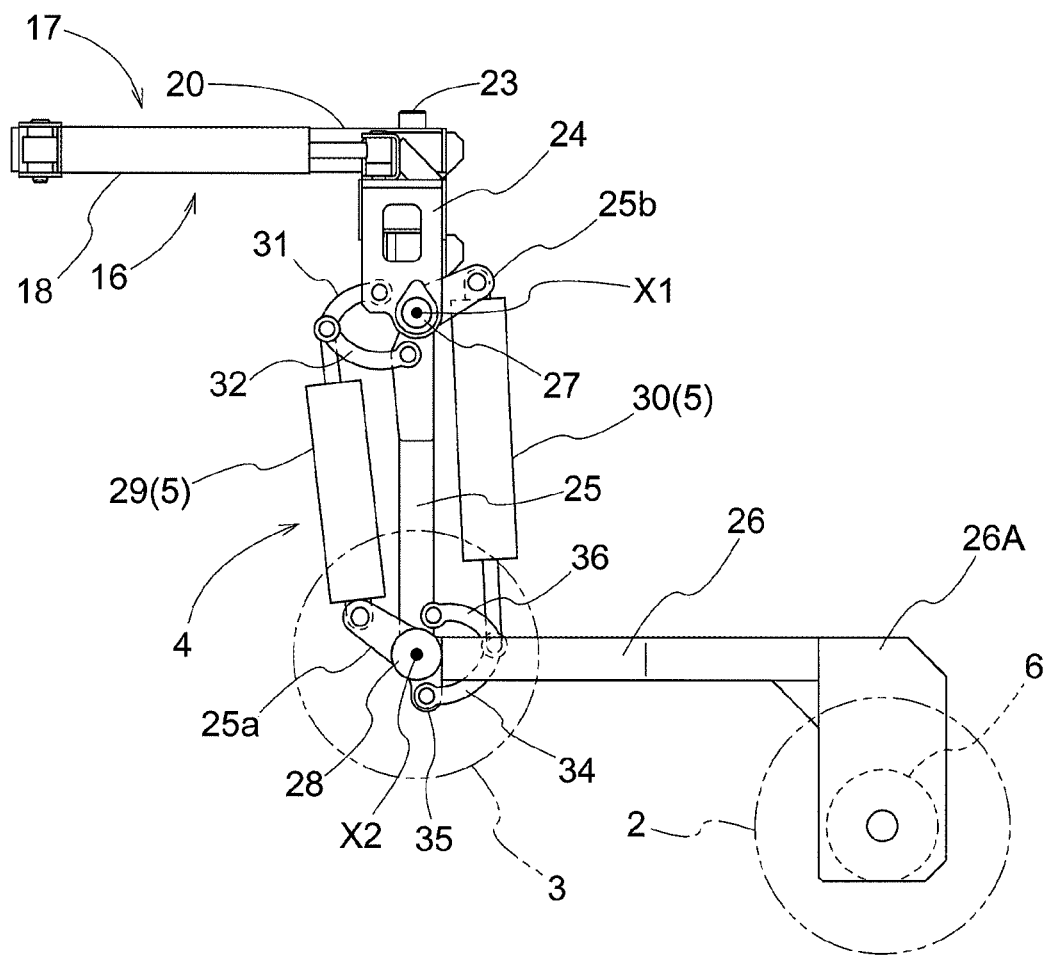
FIG. 4 is a side view of the bending link mechanism.

More specifically, as shown in FIGS. 3 and 4, the vehicle body-side support portion 17 is provided with: coupling members 20 that are fitted to and engage with the pair of square tubular front-rear frame members 19 provided on lateral side portions of the vehicle body frame 7 so as to sandwich them from lateral sides, and are detachably bolted to the front-rear frame members 19; an outer pivot bracket 21 that is located outward of the coupling member 20 in the front-rear direction of the vehicle body; an inner pivot bracket 22 that is located inward of the coupling member 20 in the front-rear direction of the vehicle body; and a pivot support shaft 23 that extends in a vertical direction and is supported by the outer pivot bracket 21. The vehicle body-side support portion 17 supports the bending link mechanisms 4 so as to be pivotable about the axis Y of the pivot support shaft 23.

Each bending link mechanism 4 is provided with: a base end portion 24 that is supported by the vehicle body-side support portion 17 so as to be pivotable about the vertical axis Y in a state where the position thereof in the top-bottom direction is fixed; a first link 25 whose one end is supported by a lower portion of the base end portion 24 so as to be pivotable about a horizontal axis X1; and a second link 26 whose one end is supported by the other end of the first link 25 so as to be pivotable about a horizontal axis X2 and whose other end supports a travel wheel 2.

More specifically, the base end portion 24 is provided so as to have a rectangular frame shape in plan view, and is supported by the outer pivot bracket 21 of the vehicle body-side support portion 17 at a position that is offset inward in the width direction of the vehicle body so as to be pivotable about the horizontal axis Y, using the pivot support shaft 23. One end of the turning cylinder 18 is coupled to the inner pivot bracket 22 so as to be pivotable, and the other end thereof is coupled to the base end portion 24 at a position that is laterally displaced from the pivot support shaft 23, so as to be pivotable.

A support shaft 27 that is provided on one end portion of the first link 25 and extends between right and left side portions of the base end portion 24 is supported so as to be rotatable, and the first link 25 is coupled to a lower portion of the base end portion 24 so as to be pivotable about the axis of the support shaft 27.

As shown in FIG. 4, the first link 25 has a base end-side arm portion 25b and a distal end-side arm portion 25a. The base end-side arm portion 25b that extends obliquely upward is integrally formed on a one end-side portion of the first link 25. The distal end-side arm portion 25a that extends obliquely upward is integrally formed on a distal end-side portion of the first link 25.

As shown in FIG. 3, the second link 26 includes a pair of right and left strip-shaped plate members 26a, 26b, and is formed in a bifurcated shape in plan view. The pair of plate members 26a, 26b are spaced apart from each other at the coupling point where the second link 26 is coupled to the first link 25. A coupling support shaft 28 for being coupled to the first link 25 is rotatably supported in an area between the pair of plate members 26a, 26b. A travel wheel 2 is supported on a swing-side end portion on the side opposite to the coupling point where the second link 26 is coupled to the first link 25. As shown in FIG. 4, an L-shaped extension portion 26A that extends in a direction away from the vehicle body 1 in a substantially L-like shape is formed on the swing-side end portion of the second link 26, and a travel wheel 2 is supported on an extension-side end portion of the L-shaped extension portion 26A.

As shown in FIG. 2, the travel wheels 2 are supported by the bending link mechanisms 4 so as to be located outward of the vehicle body in the right-left direction. Specifically, the travel wheels 2 are supported on the swing-side end portions of the second links 26 so as to be located outward of the vehicle body in the right-left direction. The hydraulic motor 6 is supported on the swing-side end portions of the second links 26 so as to be located inward of the vehicle body (opposite to the travel wheels 2) in the right-left direction.

The posture change operation means 5 that are configured to individually change the respective postures of the bending link mechanisms 4 are provided in correspondence with the plurality of bending link mechanisms 4. As shown in FIGS. 3 and 4, each posture change operation means 5 is provided with: a first hydraulic cylinder 29 that can change the swing posture of the first link 25 relative to the vehicle body 1; and a second hydraulic cylinder 30 that can change the swing posture of the second link 26 relative to the first link 25. The first hydraulic cylinder 29 and the second hydraulic cylinder 30 are provided in the vicinity of the first link 25 close to each other.

The first link 25, the first hydraulic cylinder 29 and the second hydraulic cylinder 30 are disposed between the pair of plate members 26a, 26b of the second link 26 in plan view. The first hydraulic cylinder 29 is located inward of the first link 25 in the front-rear direction of the vehicle body, so as to extend in the longitudinal direction of the first link 25. One end portion of the first hydraulic cylinder 29 is interlocked and coupled with a lower portion of the base end portion 24, using a first interlocking member 31 that has an arc-like shape. One end portion of the first hydraulic cylinder 29 is interlocked and coupled with a base end-side portion of the first link 25, using another/second interlocking member 32. The two end portions of the first interlocking member 31 and the two end portions of the second interlocking member 32 are pivotally coupled to each other so as to be pivotable relative to each other. The other end of the first hydraulic cylinder 29 is interlocked and coupled with the distal end-side arm portion 25a formed integrally with the first link 25.

The second hydraulic cylinder 30 is provided on the side opposite to the first hydraulic cylinder 29, i.e., outward of the first link 25 in the front-rear direction of the vehicle body, so as to substantially extend in the longitudinal direction of the first link 25. One end of the second hydraulic cylinder 30 is interlocked and coupled with the base end-side arm portion 25b that is formed integrally with the base end-side portion of the first link 25. The other end of the second hydraulic cylinder 30 is interlocked and coupled with an arm portion 35 that is formed integrally with a base end-side portion of the second link 26, using a third interlocking member 34. The other end of the second hydraulic cylinder 30 is also interlocked and coupled with a swing-side portion of the first link 25, using another/fourth interlocking member 36. The two end portions of the third interlocking member 34 and the two end portions of the fourth interlocking member 36 are pivotally coupled to each other so as to be pivotable relative to each other.

When the first hydraulic cylinder 29 is extended and contracted in a state where the action of the second hydraulic cylinder 30 has been stopped, the first link 25, the second link 26 and the travel wheel 2 integrally swing about the horizontal axis X1 in the portion that is pivotally coupled to the base end portion 24, while keeping their relative postures unchanged. When the second hydraulic cylinder 30 is extended and contracted in a state where the action of the first hydraulic cylinder 29 has been stopped, the second link 26 and the travel wheel 2 integrally swing about the horizontal axis X2 in the portion where the first link 25 and the second link 26 are coupled to each other, while the posture of the first link 25 is kept unchanged.

An auxiliary wheel 3 is supported by an intermediate bending portion of each of the plurality of bending link mechanisms 4 so as to be rotatable. The auxiliary wheels 3 are formed of wheels that have substantially the same outer diameter as the travel wheels 2. The coupling support shaft 28 for pivotally coupling the first link 25 and the second link 26 to each other is formed so as to extend further outward in the width direction of the vehicle body than the second link 26. The auxiliary wheel 3 is supported by the extended protrusion of the coupling support shaft 28 so as to be rotatable.

Figure 5:
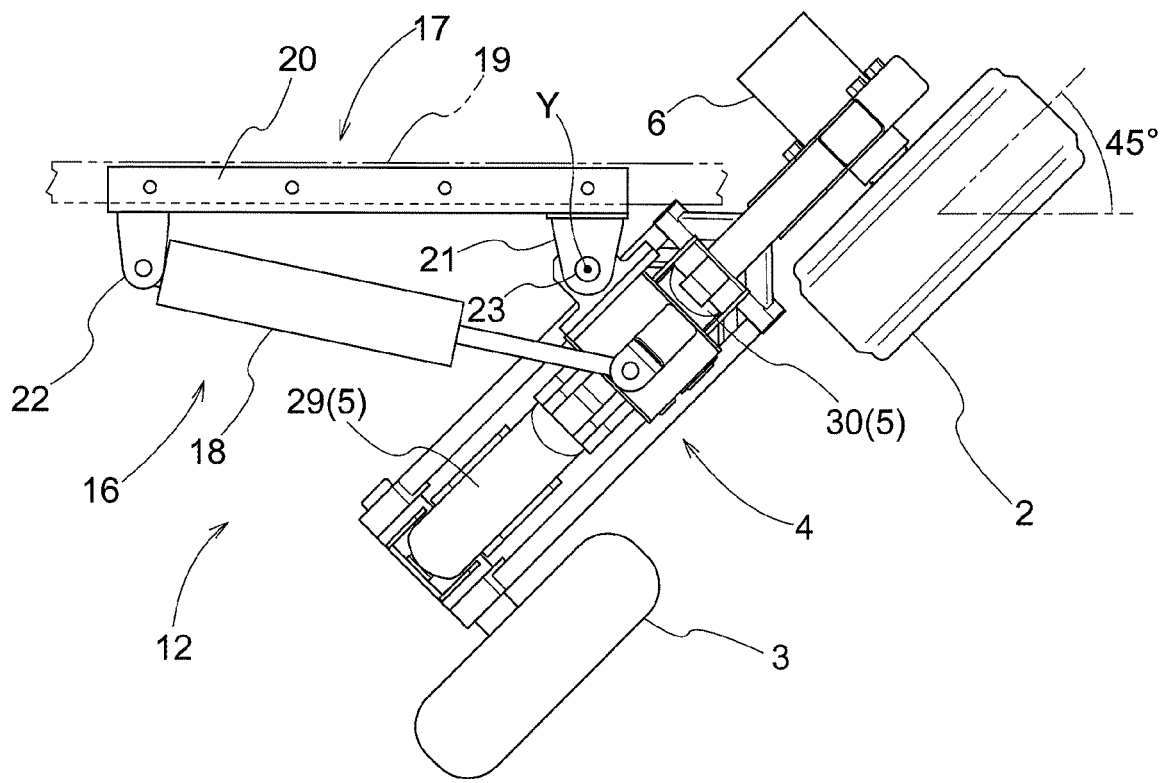
FIG. 5 is a plan view showing a left-turn state caused by a turning mechanism.
Figure 6:
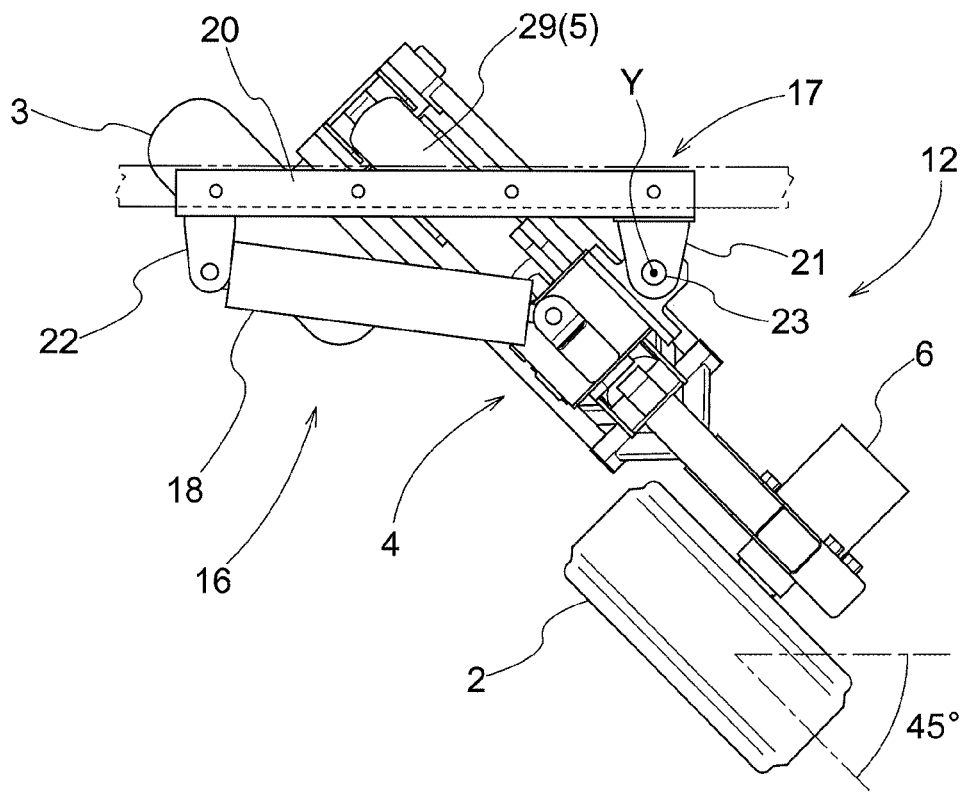
FIG. 6 is a plan view showing a right-turn state caused by the turning mechanism.

As shown in FIGS. 5 and 6, the bending link mechanism 4, the travel wheel 2, the auxiliary wheel 3 and the posture change operation means 5 are integrally supported by the outer pivot bracket 21 so as to be pivotable about the axis Y of the pivot support shaft 23. As a result of the turning cylinder 18 being operated to extract and contract, they are integrally operated to pivot. They can be operated to turn by approximately 45 degrees to the left-turn direction and the right-turn direction from the straight-travelling state in which the travel wheel 2 is orientated in the front-rear direction.

Although not shown in the drawings, it is possible to remove the turning mechanism 16, the bending link mechanism 4, the travel wheel 2, the auxiliary wheel 3 and the posture change operation means 5 from the vehicle body 1 in a state of being integrally attached to each other, by releasing the bolt coupling of the coupling member 20 with the front-rear frame member 19. Also, it is possible to attach the above-described devices to the vehicle body 1 in a state of being integrally attached to each other, by bolting the coupling member 20 to the front-rear frame member 19.

Hydraulic oil is supplied from the hydraulic supplier 8 to the first hydraulic cylinder 29 and the second hydraulic cylinder 30 of each of the plurality of bending link mechanisms 4 via the valve mechanism 9. The valve mechanism 9 supplies and discharges hydraulic oil, using the hydraulic control valves 11, to extend and contract the first hydraulic cylinder 29 and the second hydraulic cylinder 30. The hydraulic control valves 11 are controlled by the control device 13.

Also, the hydraulic control valves 11 adjust the flow rate of the hydraulic oil, using the hydraulic control valves 11 corresponding to the hydraulic motors 6, and thus the rotation speeds of the hydraulic motors 6, i.e., the rotation speeds of the travel wheels 2 can be changed. The hydraulic control valves 11 are controlled by the control device 13 based on control information input through manual operation, control information set and stored in advance or the like.

Figure 7:
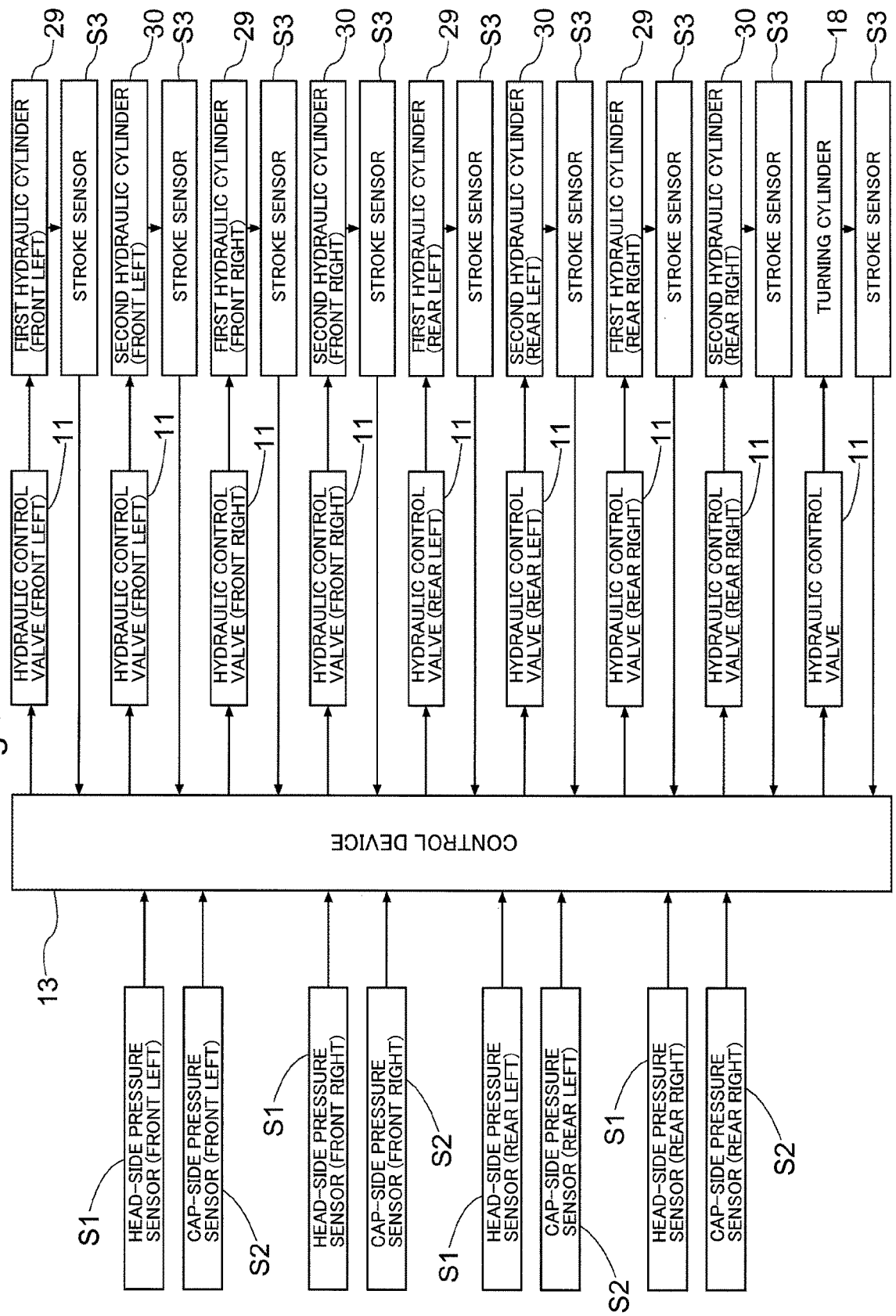
FIG. 7 is a control block diagram.

The work vehicle is provided with various sensors. Specifically, as shown in FIGS. 1 and 7, each of the four second hydraulic cylinders 30 is provided with a head-side pressure sensor S1 and a cap-side pressure sensor S2. The head-side pressure sensor S1 detects the oil pressure in the head-side chamber of the second hydraulic cylinder 30. The cap-side pressure sensor S2 detects the oil pressure in the cap-side chamber of the second hydraulic cylinder 30. The results of detection by the pressure sensors S1 and S2 are input to the control device 13.

As shown in FIG. 7, each of the four first hydraulic cylinders 29 and each of the four second hydraulic cylinders 30 are provided with a stroke sensor S3 that can detect the amount of extension/contraction operation. The amounts of extension/contraction operation of the hydraulic cylinders 29 and 30 are detection values corresponding to the swing positions of the first link 25 and the second link 26 that are operated, and the stroke sensors S3 are equivalent to the position detection sensor. The results of detection by each pressure sensor S3 is input to the control device 13.

Note that the positions to which the pressure sensors S1 and S2 are attached are not limited to those described above. The pressure sensors S1 and S2 need only be able to detect (estimate) the hydraulic pressure of the cap-side chamber or the head-side chamber corresponding thereto, and may be provided in a pipe between the valve mechanism 9 and the cap-side chamber or the head-side chamber corresponding thereto.

The thrust required to support the vehicle body 1 is calculated based on the results of detection by the sensors S1 and S2, and the supply of hydraulic oil to each second hydraulic cylinder 30 is controlled based on the results.

The vehicle body 1 is provided with an acceleration sensor S5, which is, for example, a three-axis acceleration sensor or the like. Based on the result of detection by the acceleration sensor S5, the inclination of the vehicle body 1 in the front, rear, right and left directions is detected, and the posture of the vehicle body 1 is controlled based on the result. That is to say, the supply of hydraulic oil to the first hydraulic cylinder 29 and the second hydraulic cylinder 30 is controlled so that the posture of the vehicle body 1 equals a target posture.

The travel wheels 2 are provided with rotation sensors S6 that detect the rotation speeds of the travel wheels 2 driven by the hydraulic motors 6. The supply of hydraulic oil to the hydraulic motors 6 is controlled so that the rotation speeds of the travel wheels 2 equal target values, based on the rotation speeds of the travel wheels 2 detected by the rotation sensors S6.

As described above, the work vehicle is configured to change the posture of the bending link mechanisms 4 by using the hydraulic cylinders 29 and 30 that serve as the hydraulically-driven posture change operation means 5, and is also configured to be driven by the hydraulic motors 6 to travel. Therefore, the work vehicle is unlikely to be affected by moisture, fine dust or the like, and is suitable for agricultural work.

As shown in FIG. 1, a normal travel mode of this work vehicle is a four-wheel travel state in which all of the four travel wheels 2 are in contact with the ground and all of the four auxiliary wheels 3 are raised from the ground. Although not described in detail, in addition to this mode, various modes may be employed as travel modes by changing the posture of the bending link mechanisms 4.

Next, posture change control for the vehicle 1 body in the four-wheel travel mode will be described.

FIG. 7 shows a control block diagram. The control device 13 includes a microcomputer or the like, for example, and can perform various kinds of control according to a control program. Although not described in detail, the control device 13 performs control to set the posture of the vehicle body 1 to be in an appropriate state according to the situation of work at the moment, based on control information input through manual operation, control information set and stored in advance or the like. Although not shown in the drawings, the control device 13 also controls hydraulic oil supplied to the plurality of hydraulic motors 6.

Regarding the four first hydraulic cylinders 29 and the four second hydraulic cylinders 30, in a state where the work vehicle has stopped travelling, the control device 13 performs position control to switch the hydraulic control valves 11 to operate the hydraulic cylinders 29 and 30 so that the amounts of extension/contraction operation detected by the stroke sensors S3 of the hydraulic cylinders 29 and 30 equal the detection values corresponding to the target posture.

Regarding the four first hydraulic cylinders 29, when the work vehicle travels on uneven terrain or the like with many protrusions and recesses, the control device 13 performs position control to switch the hydraulic control valves 11 to operate the hydraulic cylinder 29 so that the amounts of extension/contraction operation detected by the stroke sensors S3 of the hydraulic cylinders 29 equal the detection values corresponding to the target posture. In contrast, the action of the four second hydraulic cylinders 30 are controlled based on information detected by the above-described pressure sensors S1 and S2. Superficially, the control device 13 calculates the thrust of the second hydraulic cylinders 30 based on the detection value of the head-side pressure sensors S1 and the detection value of the cap-side pressure sensors S2. Thereafter, the control device 13 switches the hydraulic control valves 11 to control the action of the second hydraulic cylinders 30 so that the detected thrust has the target value set and stored in advance.

More specifically, when there is a recess in the ground and a travel wheel 2 is raised from the ground, the ground reaction force becomes small and the travel wheel 2 idles. It is envisioned that the thrust of the second hydraulic cylinder 30 is small at this time. In contrast, when a travel wheel 2 rides on a protrusion on the ground, the ground reaction force becomes large and the travel wheel 2 is hindered from rotating. It is envisioned that the thrust of the second hydraulic cylinder 30 is large at this time. Such a change in the ground reaction force is detected by the pressure sensors S1 and S2, and the action of the second hydraulic cylinder 30 is controlled so that the thrusts detected based on the detection results of the pressure sensors S1 and S2 have the target values. Thus, the ground reaction force of the travel wheel 2 is maintained at an appropriate value. As a result, the travel wheels 2 move up and down while following the protrusions and recesses of the ground, and the work vehicle can desirably travel on an uneven terrain with the vehicle body 1 being supported so as to be maintained in an appropriate state of contact with the ground, in which the plurality of travel wheels 2 are prevented from idling or being hindered from rotating.

Furthermore, upon being instructed to perform a turn operation, the control device 13 performs turn control to switch the hydraulic control valves 11 and operate the turning cylinders 18 so that the amounts of extension/contraction operation detected by the stroke sensors S3 provided in the turning cylinders 18 equal the detection value corresponding to the target turn angle.

If turn control is to be performed so that the work vehicle performs turn travel while the work vehicle is performing location change traveling, when the control device 13 is to perform an orientation change operation on either the front right and left travel wheels 2 or the rear right and left travel wheels, the control device 13 controls the action of the posture change operation means 5 so that the position of the center of gravity of the vehicle body 1 moves toward the side opposite to the side to which the orientation change operation is performed, in the front-rear direction of the vehicle body.

Specifically, the control device 13 activates the posture change operation means 5 such that the bending link mechanisms 4 located on the side to which the orientation change operation is performed in the front-rear direction of the vehicle body move the vehicle body 1 away from the travel wheels 2 that are in contact with the ground, and activates the posture change operation means 5 such that the bending link mechanisms 4 located opposite to the side to which the orientation change operation is performed in the front-rear direction of the vehicle body move the vehicle body 1 closer to the travel wheels 2 that are in contact with the ground.

Figure 10:
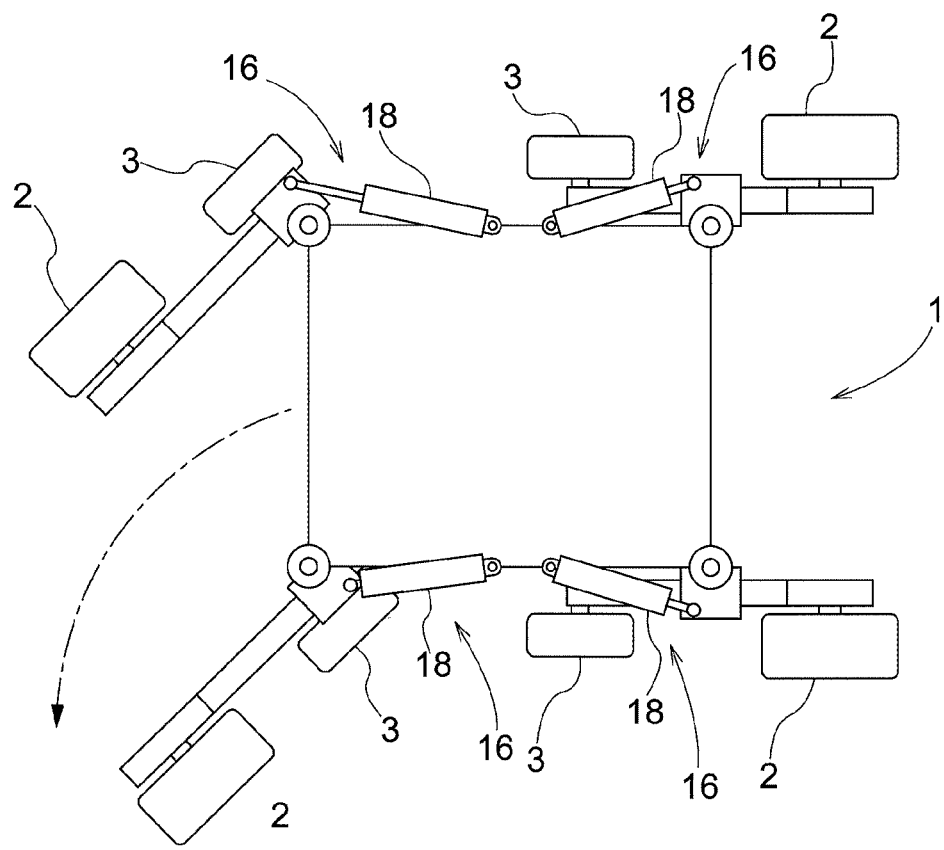
FIG. 10 is a schematic plan view of the work vehicle in a turning state.
Figure 11:
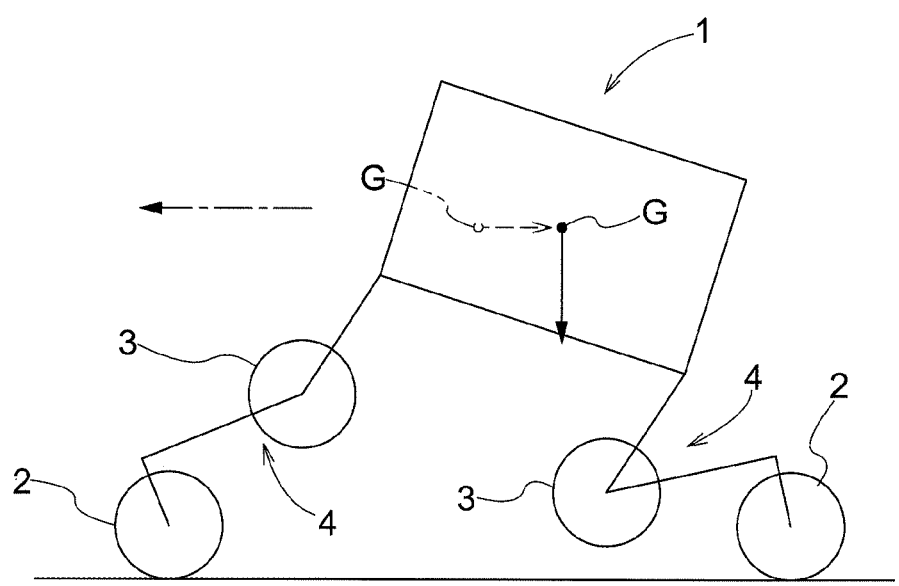
FIG. 11 is a schematic side view of the work vehicle in the turning state.
Figure 12:
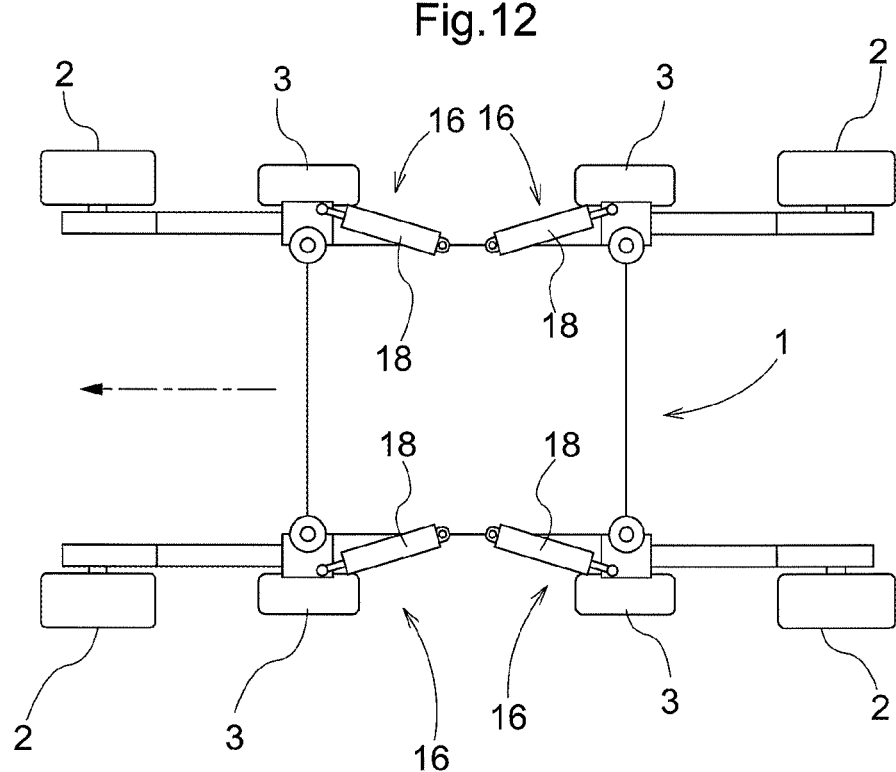
FIG. 12 is a schematic plan view of the work vehicle in a straight-travelling state.
Figure 13:
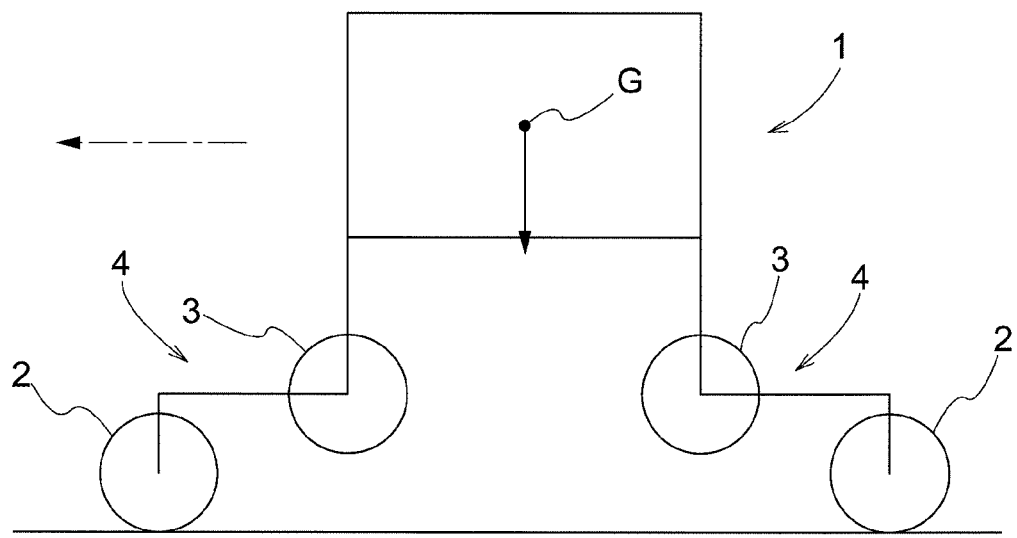
FIG. 13 is a schematic side view of the work vehicle in the straight-travelling state.

More specifically, for example, as shown in FIG. 10, when the turning cylinder 18 works so as to change the orientation of the right and left travel wheels 2 on the front side in the direction of travel of the vehicle body to the left, as shown in FIG. 11, regarding the right and left bending link mechanisms 4 that support the travel wheels 2 on the front side of the vehicle body, the front left and front right second hydraulic cylinders 30 work such that the base end portions of the second links 26 thereof swing upward, and regarding the right and left bending link mechanisms 4 that support the travel wheels 2 on the rear side of the vehicle body, the rear left and rear right second hydraulic cylinders 30 work such that the base end portions of the second links 26 thereof swing downward. As a result, the posture of the vehicle body 1 is switched to a front-rear inclined posture in which the front side is raised and the rear side is lowered. Thus, as shown in FIGS. 12 and 13, the position of the center of gravity of the vehicle body 1 moves toward the side opposite to the side to which the orientation change operation is performed in the front-rear direction of the vehicle body, from the position when the work vehicle travels in a straight-travelling state.

By changing the posture to the front-rear inclined posture as described above, it is possible to reduce the load of the vehicle body 1 on the travel wheels 2 on the front side that is operated to turn, in other words, the load received from the ground by the travel wheels 2 that resist the movement when the orientation is changed. Thus, it is possible to smoothly perform the orientation change operation.

Other Embodiments Modified from First Embodiment (1) The above-described embodiment employs a configuration in which the stroke sensors S3 are used as position detection sensors. However, instead of such a configuration, it is possible to employ a configuration in which rotary potentiometers or the like provided at the swing support points of the first links 25.

(2) The above-described embodiment employs a configuration in which the auxiliary wheels 3 are freely rotatable. However, it is possible to employ a configuration in which the auxiliary wheels 3 are driven to rotate or a configuration in which such auxiliary wheels 3 are not provided.

(3) The above-described embodiment employs a configuration in which the travel wheels 2 are driven by the hydraulic motors 6. However, instead of such a configuration, it is possible to employ a configuration in which, for example, power from the engine is supplied to the travel wheels 2 via a mechanical power transmission mechanism such as a chain power transmission mechanism. Alternatively, various configurations may be employed, such as a configuration in which the travel wheels 2 are driven by an electric motor, and a configuration in which power from the engine is transmitted to each of the travel wheels 2 via a continuously variable transmission mechanism.

(4) The above-described embodiment employs a configuration in which the hydraulic supplier 8 can be slid laterally and attached to or removed from the hydraulic supplier 8 from the vehicle body 1 by removing/attaching the support frame 10 from/to the vehicle body frame 7. However, instead of such a configuration, it is possible to employ a configuration in which the hydraulic supplier 8 is supported on the support frame 10 so as to be slid laterally and attached to or removed therefrom.

(5) The above-described embodiment employs a configuration in which the support frame 10 is provided with the ground-engaging support members 10E that are in contact with the ground in a non-slip state. However, instead of such a configuration, it is possible to employ a configuration in which a plurality of caster wheels that are respectively located on the right and left sides of the front and rear portions are provided and such caster wheels support the vehicle body in a state of being in contact with the ground, for example. In this case, it is preferable that a stopper member that can switch to a state in which the caster wheels freely rotate and a state in which the rotation is restricted is provided.

(6) Although the above-described embodiment employs a configuration in which the hydraulic supplier 8 is provided with an engine and a hydraulic pump driven by the engine, it is possible to employ a configuration in which the hydraulic pump is driven by an electric motor instead of the engine.

(7) The above-described embodiment employs a configuration in which the posture change operation means 5 include a plurality of hydraulic cylinders 29 and 30. However, instead of such a configuration, it is possible to employ a configuration in which a hydraulic motor is provided at a pivot point between links so that the posture can be changed.

(8) The above-described embodiment employs a configuration in which the posture change operation means 5 works such that the bending link mechanisms 4 located on the side to which the orientation change operation is performed in the front-rear direction move the vehicle body 1 away from the travel wheels 2 that are in contact with the ground, and such that the bending link mechanisms 4 located on the opposite side move the vehicle body 1 closer to the travel wheels 2 that are in contact with the ground. However, instead of such a configuration, it is possible to employ a configuration in which the position of the center of gravity can be moved by sliding a heavy object provided on the vehicle body 1, for example, an engine or the like, in the front-rear direction of the vehicle body, from the side to which the orientation change operation is performed to the opposite side.

(9) The above-described embodiment employs a configuration in which the stroke sensors S3 that detect the amount of extension/contraction operation of the turning cylinders 18 are provided. However, instead of such a configuration, it is possible to employ a configuration in which the amount of extension/contraction operation is detected by rotary potentiometers provided at the swing support points of the first links 25.

(10) The above-described embodiment employs a configuration in which the turning mechanisms 16 (the turning operation means) are provided with the turning cylinders 18. However, it is possible to employ a configuration in which turning operation is performed by an electric motor or a hydraulic motor.

(11) The above-described embodiment employs a configuration in which the auxiliary wheels 3 are supported so as to be freely rotatable. However, it is possible to employ a configuration in which the auxiliary wheels 3 are driven to rotate or a configuration in which such auxiliary wheels 3 are not provided.

(12) The above-described embodiment employs a configuration in which the travel wheels 2 are driven by the hydraulic motors 6. However, instead of such a configuration, it is possible to employ a configuration in which, for example, power from the engine is supplied to the travel wheels 2 via a mechanical power transmission mechanism such as a chain power transmission mechanism.

Second Embodiment

Figure 17:
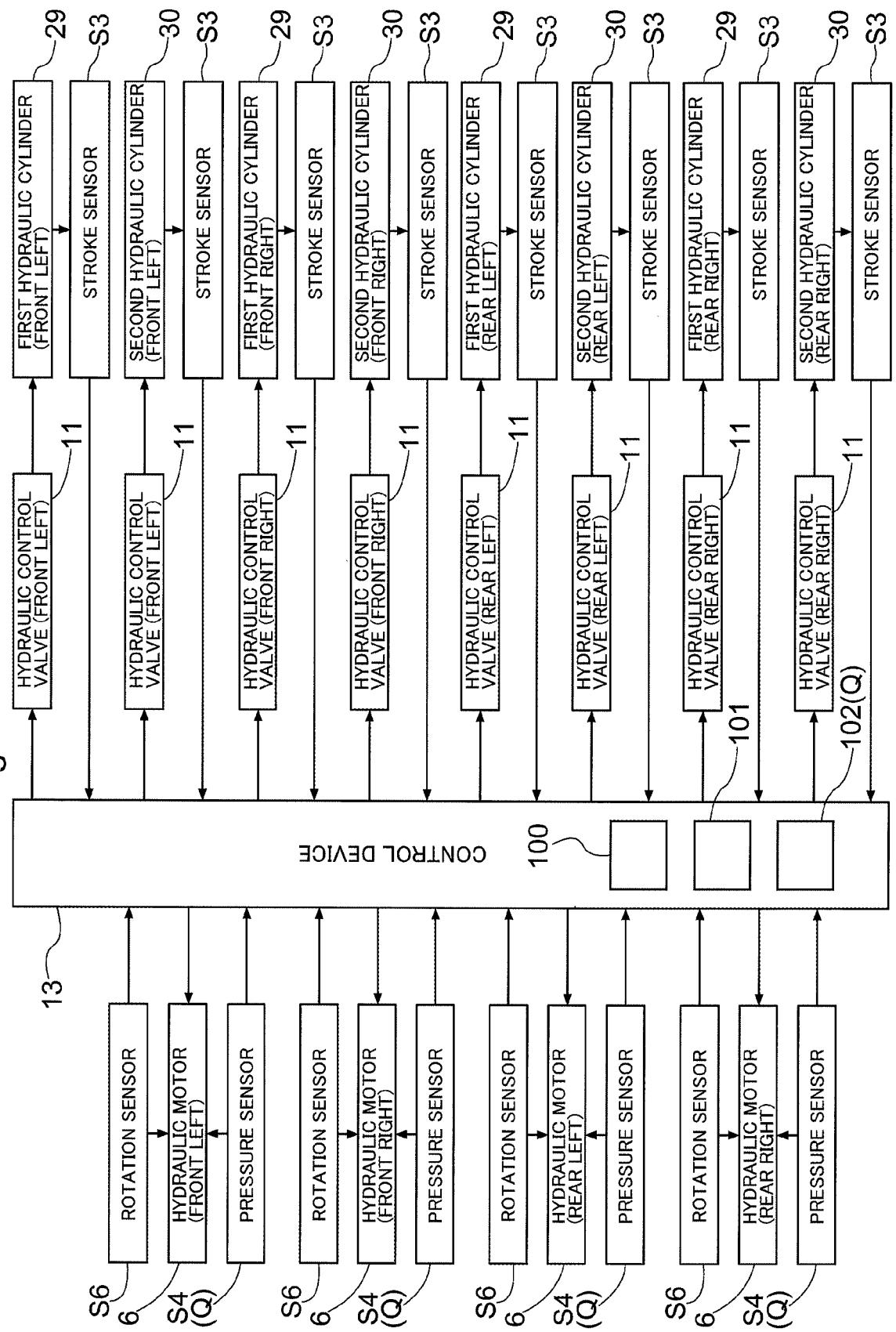
FIG. 17 is a control block diagram according to a second embodiment.

The control block diagram shown in FIG. 17 according to the second embodiment is different from that shown in FIG. 7 according to the first embodiment, and other components are the same as those in the first embodiment. The following mainly describes differences.

As shown in FIG. 17, each of the four first hydraulic cylinders 29 and each of the four second hydraulic cylinders 30 are provided with a stroke sensor S3 that can detect the amount of extension/contraction operation. The amounts of extension/contraction operation of the hydraulic cylinders 29 and 30 are detection values corresponding to the swing positions of the first link 25 and the second link 26 that are operated, and the result of detection by each stroke sensor S3 is input to the control device 13.

As shown in FIG. 1, the vehicle body 1 is provided with an acceleration sensor S5, which is, for example, a three-axis acceleration sensor or the like. Based on the result of detection by the acceleration sensor S5, the inclination of the vehicle body 1 in the front, rear, right and left directions is detected, and the posture of the vehicle body 1 is controlled based on the result. That is to say, the supply of hydraulic oil to the first hydraulic cylinder 29 and the second hydraulic cylinder 30 is controlled so that the posture of the vehicle body 1 equals a target posture.

The travel wheels 2 are provided with rotation sensors S6 (examples of drive speed detection means) that detect the rotation speeds of the travel wheels 2 driven by the hydraulic motors 6. The supply of hydraulic oil to the hydraulic motors 6 is controlled so that the rotation speeds of the travel wheels 2 equal target values, based on the rotation speeds of the travel wheels 2 detected by the rotation sensors S6.

As described above, the work vehicle is configured to change the posture of the bending link mechanisms 4 by using the hydraulic cylinders 29 and 30 that serve as the hydraulically-driven posture change operation means 5, and is also configured to be driven by the hydraulic motors 6 to travel. Therefore, the work vehicle is unlikely to be affected by moisture, fine dust or the like, and is suitable for agricultural work.

As shown in FIG. 1, a normal travel mode of this work vehicle is a four-wheel travel state in which all of the four travel wheels 2 are in contact with the ground and all of the four auxiliary wheels 3 are raised from the ground. Although not described in detail, in addition to this mode, various modes may be employed as travel modes by changing the posture of the bending link mechanisms 4.

Next, operation control for the vehicle body 1 in the four-wheel travel mode will be described.

FIG. 17 shows a control block diagram. The control device 13 includes a microcomputer or the like, for example, and can perform various kinds of control according to a control program. Although not described in detail, the control device 13 includes a posture control unit 100 (an example of a control means) that performs control to set the posture of the vehicle body 1 to be in an appropriate state according to the situation of work at the moment, based on control information input through manual operation, control information set and stored in advance or the like.

Regarding the four first hydraulic cylinders 29 and the four second hydraulic cylinders 30, in both a state where the work vehicle has stopped travelling and a state where the work vehicle is performing location change traveling, the posture control unit 100 performs position control to switch the hydraulic control valves 11 to operate the hydraulic cylinders 29 and 30 so that the amounts of extension/contraction operation detected by the stroke sensors S3 of the hydraulic cylinders 29 and 30 equal the detection values corresponding to the target posture.

The control device 13 includes a travel drive control unit 101 that controls the plurality of hydraulic motors 6 so that the travel speed of the vehicle body 1 equals an appropriate speed according to the situation of work at the moment, based on control information input through manual operation, control information set and stored in advance or the like. The travel drive control unit 101 controls the actions of the hydraulic motors 6 so that the rotation speeds of the travel wheels 2 detected by the rotation sensors S6 equal the target speeds set in advance based on the above-described control information.

This work vehicle is provided with idling state detection means Q that detect whether or not the travel wheels 2 are in an idling state when the work vehicle travels on an uneven terrain with many protrusions and recesses. Each idling state detection means Q includes a pressure sensor S4 that detects the internal pressure of the hydraulic oil supply path in a hydraulic motor 6, and a determination means (a determination unit 102) that determines that the travel wheel 2 is in an idling state when the internal pressure falls below a predetermined setting value, based on the information detected by the pressure sensor S4.

More specifically, as shown in FIGS. 1 and 17, the pressure sensors S4 that detect the internal pressures in the hydraulic oil supply paths are provided in correspondence with the four hydraulic motors 6, and the results of detection are input to the control device 13. The control device 13 includes a determination unit 102 (an example of a determination means) that compares the input values (internal pressures) detected by the pressure sensors S4 with a preset set value, and if the detected value (internal pressure) of any of the pressure sensors S4 is lower than the preset value, determines the travel wheel 2 corresponding thereto is idling.

If there is a travel wheel 2 that has been determined by the determination unit 102 as being idle, the posture control unit 100 activates the second hydraulic cylinder 30 to lower the travel wheel 2. Upon the detection value (the internal pressure) of the pressure sensor S4 returning to be greater than or equal to the set value, the posture control unit 100 stops the action of the second hydraulic cylinder 30.

More specifically, when there is a recess in the ground and a travel wheel 2 is raised from the ground, or when the work vehicle travels on a slippery road surface, a travel wheel 2 may idle. At this time, it is envisaged that the load pressure on the hydraulic motor 6 significantly decreases. Such a change in the load pressure is detected by a pressure sensor S4. When the detection value of a pressure sensor S4 falls below the set value, the action of the second hydraulic cylinder 30 is controlled so that the travel wheel 2 can achieve proper travel drive force, and resolve the idling state. As a result, the travel wheels 2 move up and down while following the protrusions and recesses of the ground, and the work vehicle can desirably travel on an uneven terrain with the vehicle body 1 being supported so as to be maintained in an appropriate state of contact with the ground, in which the plurality of travel wheels 2 are prevented from idling or being hindered from rotating.

Other Embodiments Modified from Second Embodiment (1) Although the above-described embodiment shows that the idling state detection means Q is constituted by a pressure sensor S4 and a determination unit 102, the following configuration may be employed.

That is to say, each idling state detection means Q may include a rotation sensor S6 (an example of a drive speed detection means) that detects the drive speed of the hydraulic motor 6, a travel speed detection means for detecting the actual travel speed of the vehicle body 1, and a determination means for determining that the travel wheel 2 is in an idling state when the drive speed of the hydraulic motor 6 detected by the rotation sensor S6 is greater than the actual travel speed detected by the travel speed detection means, by a preset amount or more.

More specifically, for example, four hydraulic motors 6 may be provided as travel speed detection means in correspondence with the four travel wheels 2, calculate the average value of the drive speed of the four hydraulic motors, and calculate the travel speed based on the average value. Instead of such a configuration, it is possible to use a measurement device that can calculate an absolute travel speed of the work vehicle on the ground, using a vehicle speed sensor that utilizes a millimeter wave radar.

Then, the control device 13 compares the driving speed of one hydraulic motor 6 that is a measurement target, with the actual travel speed of the vehicle body 1 measured by the travel speed detection means as described above, and determines whether or not the travel wheel 2 is in an idling state by performing processing through which a travel wheel 2 is determined as being in an idling state when the drive speed is higher than the actual travel speed by a preset amount or more.

(2) The above-described embodiment shows a configuration in which the raising/lowering support mechanism is constituted by the bending link mechanism 4 in which two links 25 and 26 are pivotally coupled to each other. However, instead of such a configuration, it is possible to employ a configuration in which three or more links are provided. Also, instead of the link mechanism, it is possible to employ or a configuration in which the travel wheel 2 is supported by a support mechanism that has a cylinder that can extend in a top-bottom direction relative to the vehicle body 1, for example.

(3) The above-described embodiment employs a configuration in which the posture change operation means 5 include a plurality of hydraulic cylinders 29 and 30. However, instead of such a configuration, it is possible to employ a configuration in which a hydraulic motor, an electric motor or the like is provided at a pivot point between links so that the posture can be changed.

(4) The above-described embodiment employs a configuration in which the travel drive devices are constituted by the hydraulic motors 6. However, instead of such a configuration, it is possible to employ various configurations, such as a configuration in which the travel wheels 2 are driven by an electric motor, and a configuration in which power from the engine is transmitted to each of the travel wheels 2 via a continuously variable transmission mechanism.

Third Embodiment

Figure 18:
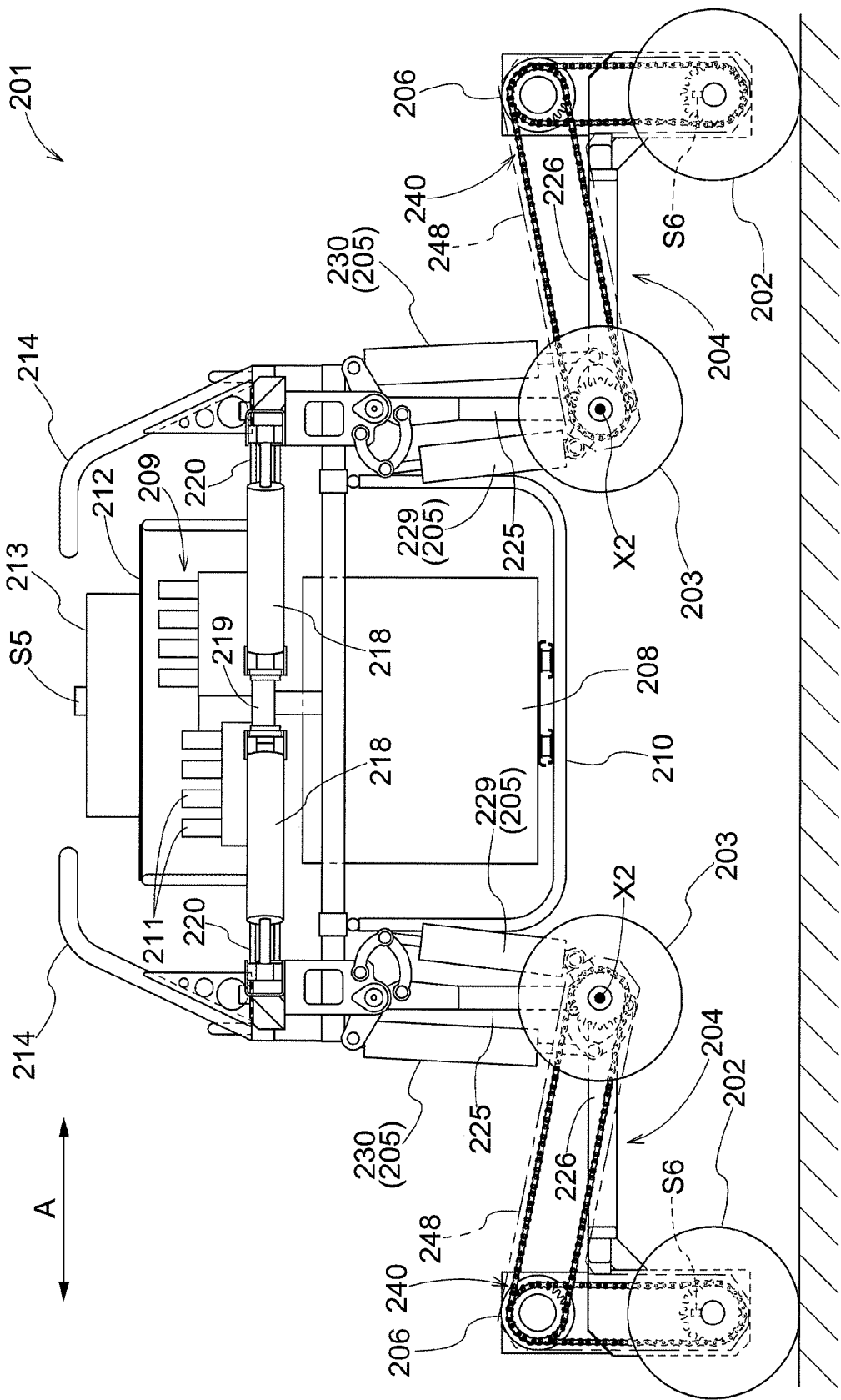
FIG. 18 shows a third embodiment (the same applies up to FIG. 25) and is an overall side view of a work vehicle.
Figure 19:
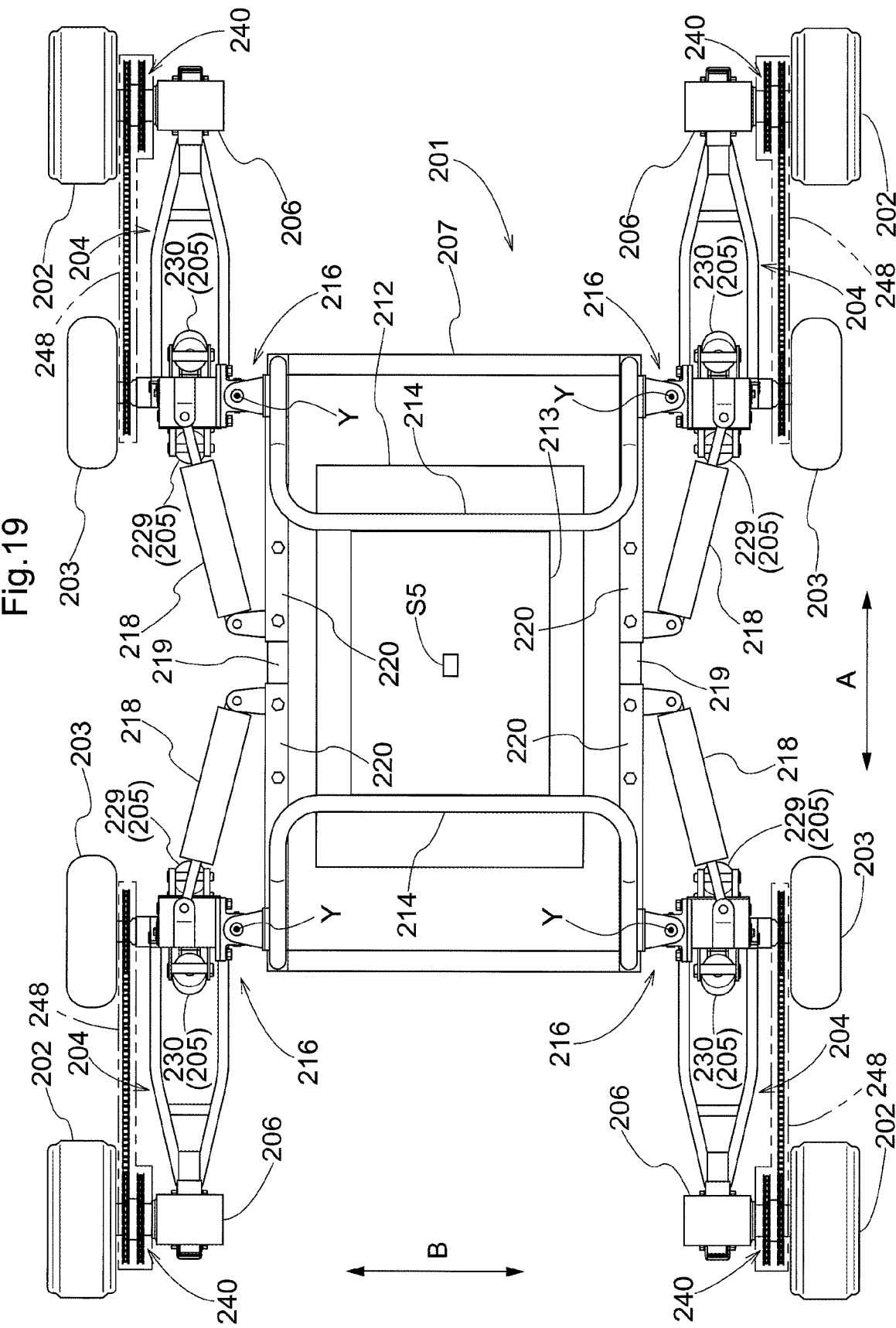
FIG. 19 is an overall plan view of the work vehicle.

As shown in FIGS. 18 and 19, the work vehicle is provided with, for example: a vehicle body 201 that has a substantially rectangular shape in plan view and supports the entire vehicle; a plurality of (specifically, four) travel wheels 202; a plurality of auxiliary wheels 203 that are provided in correspondence to the plurality of travel wheels 202, respectively; bending link mechanisms 204 (examples of raising/lowering support mechanisms) that support the plurality of travel wheels 202 on the vehicle body 201 such that the positions thereof can be individually changed; posture change operation means 205 that are hydraulically driven and can perform change operation on the bending link mechanisms 204; and a plurality of hydraulic motors 206 (examples of travel drive devices) that respectively drive the plurality of travel wheels 202. A pair of right and left bending link mechanisms 204, a pair of right and left travel wheels 202, and a pair of right and left auxiliary wheels 203 are provided on both front side and rear side of the vehicle body 201.

The vehicle body 201 is provided with: a vehicle body frame 207 that has a substantially frame-like shape and supports the entire vehicle body 201; a hydraulic supplier 208 that feeds out hydraulic oil to the posture change operation means 205; and a valve mechanism 209 that controls hydraulic oil to be supplied from the hydraulic supplier 208 to the posture change operation means 205. Although not described in detail, the hydraulic supplier 208 is provided with an engine and a hydraulic pump that is driven by the engine, which are integrally coupled to each other. The hydraulic supplier 208 is mounted on and supported by a support base 210 that is coupled to a lower portion of the vehicle body frame 207 so as to be located in the underpart of the vehicle body 201. The hydraulic supplier 208 feeds out and supplies hydraulic oil to the posture change operation means 205 via the valve mechanism 209, using the hydraulic pump driven by the engine. Although not shown in the drawings, it is possible to laterally slide the hydraulic supplier 208 and the support frame 210 coupled to each other as a single body and remove them from the vehicle body 201 by removing the support frame 210 from the vehicle body frame 207, and it is possible to laterally slide them and attach them again by attaching the supporting frame 210 to the vehicle body frame 207.

The valve mechanism 209 is provided in the state of being mounted on and supported by an upper portion of the vehicle body frame 207, and includes a plurality of hydraulic control valves 211 for supplying/discharging hydraulic oil to/from the posture change operation means 205 or adjusting the flow rate, for example. The valve mechanism 209 is covered by a storage case 212 from above. A control device 213 for controlling the action of the valve mechanism 209 is provided above the storage case 212.

Exterior frames 214 for protecting the valve mechanism 209 stored in the storage case 212, the control device 213 provided above and so on when the vehicle body 201 falls over, are provided above the vehicle body frame 207. The exterior frames 214 are provided respectively on front and rear sides, and are each formed by bending a rod-shaped member into a substantially U-like shape in plan view and a substantially L-like shape in a side view, and right and left end portions thereof are attached and fixed to front and rear end portions of the vehicle body frame 207. The front and rear exterior frames 214 are provided such that their respective upper portions are located close to each other, and are shaped so as to cover outer peripheral portions of the valve mechanism 209, the control device 213 and so on.

Next, a support structure for supporting the travel wheels 202 on the vehicle body 201 will be described.

The plurality of (specifically, four) travel wheels 202 are supported on the vehicle body 201, using the bending link mechanisms 204 so as to be capable of being individually raised and lowered. Each bending link mechanism 204 is supported on the vehicle body frame 207 using a turning mechanism 216 so as to be pivotable about a vertical axis Y.

The turning mechanism 216 is provided with: a vehicle body-side support portion 217 (see FIGS. 20 and 21) that is coupled to the vehicle body frame 207 and supports the bending link mechanisms 204 so as to be pivotable; and a turning hydraulic cylinder (hereinafter referred to as a turning cylinder) 18 for allowing the bending link mechanism 204 to be operated to turn.

Figure 20:
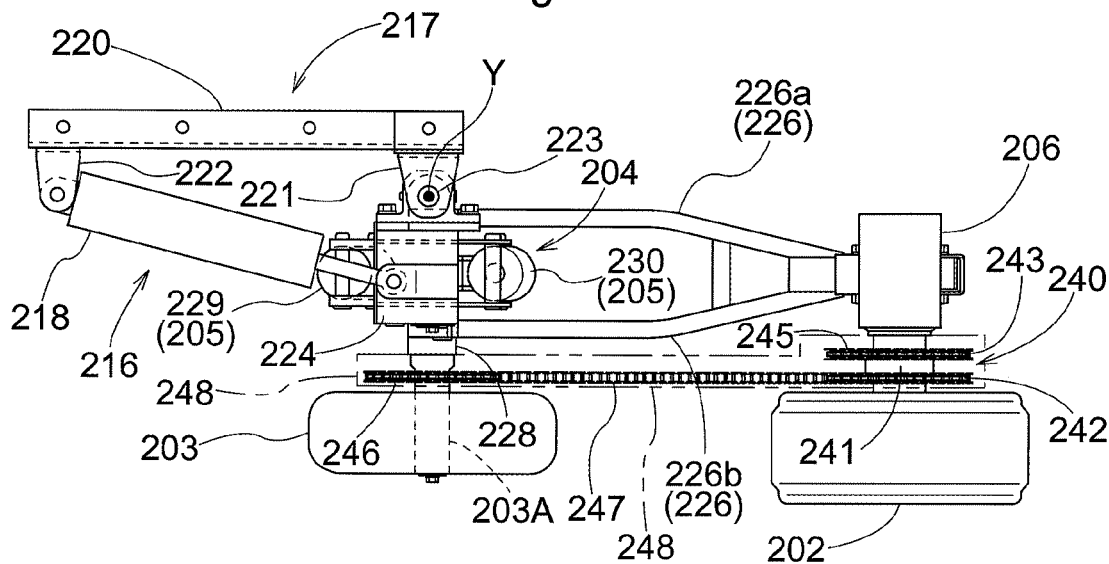
FIG. 20 is a plan view of a bending link mechanism.
Figure 21:
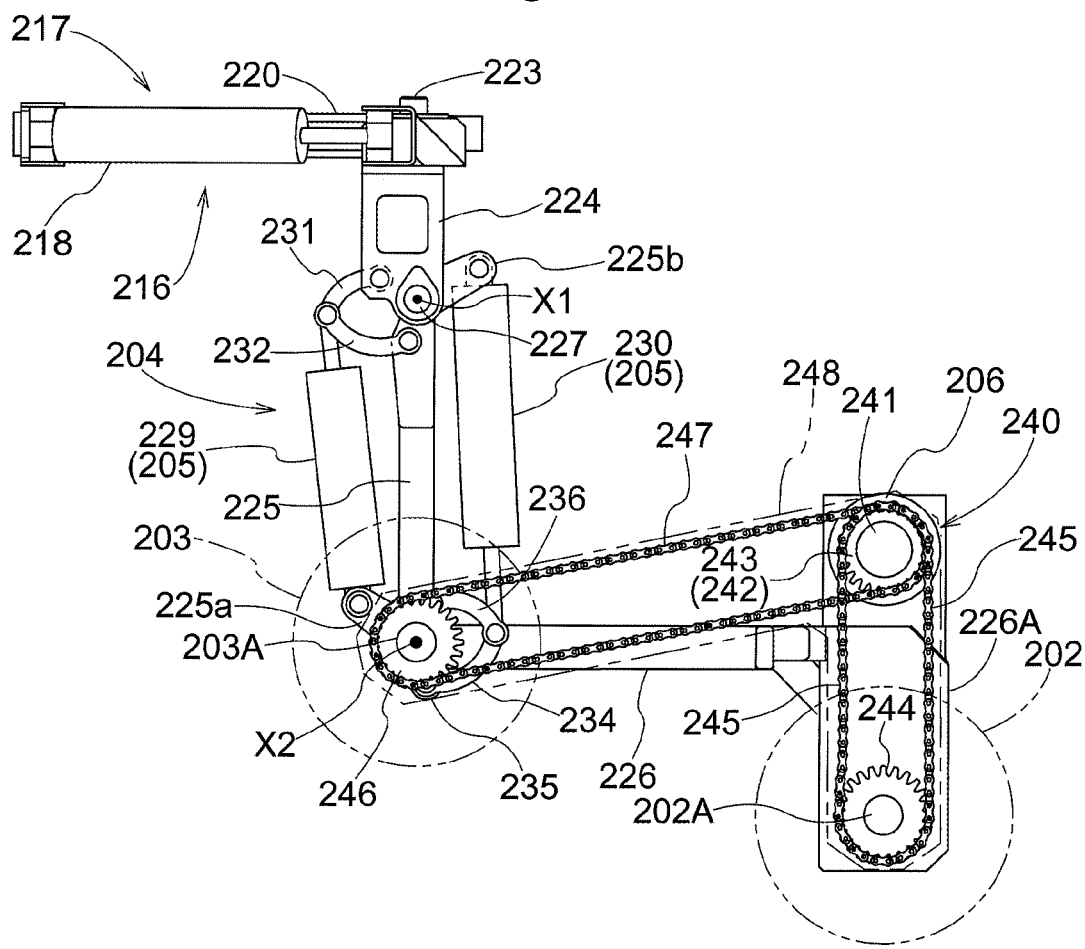
FIG. 21 is a side view of the bending link mechanism.

More specifically, as shown in FIGS. 20 and 21, the vehicle body-side support portion 217 is provided with: coupling members 220 that are fitted to and engage with the pair of upper and lower square tubular front-rear frame members 219 provided on lateral side portions of the vehicle body frame 207 so as to sandwich them from lateral sides, and are detachably bolted to the front-rear frame members 219; an outer pivot bracket 221 that is located outward of the coupling member 220 in the front-rear direction of the vehicle body; an inner pivot bracket 222 that is located inward of the coupling member 220 in the front-rear direction of the vehicle body; and a pivot support shaft 223 that extends in a vertical direction and is supported by the outer pivot bracket 221. The vehicle body-side support portion 217 supports the bending link mechanisms 204 so as to be pivotable about the axis Y of the pivot support shaft 223.

The bending link mechanisms 204 is provided with: a base end portion 224 that is supported by the vehicle body-side support portion 217 so as to be pivotable about the vertical axis Y in a state where the position thereof in the top-bottom direction is fixed; a first link 225 whose one end is supported by a lower portion of the base end portion 224 so as to be pivotable about a horizontal axis X1; and a second link 226 whose one end is supported by the other end of the first link 225 so as to be pivotable about a horizontal axis X2 and whose other end supports a travel wheel 202.

More specifically, the base end portion 224 is provided so as to have a rectangular frame shape in plan view, and is supported by the outer pivot bracket 221 of the vehicle body-side support portion 217 at a position that is offset inward in the width direction of the vehicle body so as to be pivotable about the horizontal axis Y, using the pivot support shaft 223. One end of the turning cylinder 218 is coupled to the inner pivot bracket 222 so as to be pivotable, and the other end thereof is coupled to the base end portion 224 at a position that is laterally displaced from the pivot support shaft 223, so as to be pivotable.

A support shaft 227 that is provided on one end portion of the first link 225 and extends between right and left side portions of the base end portion 224 is supported so as to be rotatable, and the first link 225 is coupled to a lower portion of the base end portion 224 so as to be pivotable about the axis of the support shaft 227.

As shown in FIG. 21, the first link 225 has a base end-side arm portion 225b and a distal end-side arm portion 225a. The base end-side arm portion 225b that extends obliquely upward is integrally formed on a one end-side portion of the first link 225. The distal end-side arm portion 225a that extends obliquely upward is integrally formed on a distal end-side portion of the first link 225.

As shown in FIG. 20, the second link 226 includes a pair of right and left strip-shaped plate members 226a, 226b, and is formed in a bifurcated shape in plan view. The pair of plate members 226a, 226b are spaced apart from each other at the coupling point where the second link 226 is coupled to the first link 225. A coupling support shaft 228 for being coupled to the first link 225 is rotatably supported in an area between the pair of plate members 226a, 226b. A travel wheel 202 is supported on a swing-side end portion on the side opposite to the coupling point where the second link 226 is coupled to the first link 225. As shown in FIG. 21, an L-shaped extension portion 226A that extends in a direction away from the vehicle body 201 in a substantially L-like shape is formed on the swing-side end portion of the second link 226, and a travel wheel 202 is supported on an extension-side end portion of the L-shaped extension portion 226A.

As shown in FIG. 19, the travel wheels 202 are supported by the bending link mechanisms 204 so as to be located outward of the vehicle body in the right-left direction. Specifically, the travel wheels 202 are supported on the swing-side end portions of the second links 226 so as to be located outward of the vehicle body in the right-left direction.

The posture change operation means 205 that are configured to individually change the respective postures of the bending link mechanisms 204 are provided in correspondence with the plurality of bending link mechanisms 204. As shown in FIGS. 20 and 21, each posture change operation means 205 is provided with: a first hydraulic cylinder 229 that can change the swing posture of the first link 225 relative to the vehicle body 201; and a second hydraulic cylinder 230 that can change the swing posture of the second link 226 relative to the first link 225. The first hydraulic cylinder 229 and the second hydraulic cylinder 230 are provided in the vicinity of the first link 225 close to each other.

The first link 225, the first hydraulic cylinder 229 and the second hydraulic cylinder 230 are disposed between the pair of plate members 226a, 226b of the second link 226 in plan view. The first hydraulic cylinder 229 is located inward of the first link 225 in the front-rear direction of the vehicle body, so as to extend in the longitudinal direction of the first link 225. One end portion of the first hydraulic cylinder 229 is interlocked and coupled with a lower portion of the base end portion 224, using a first interlocking member 231 that has an arc-like shape. One end portion of the first hydraulic cylinder 229 is interlocked and coupled with a base end-side portion of the first link 225, using another/second interlocking member 232. The two end portions of the first interlocking member 231 and the two end portions of the second interlocking member 232 are pivotally coupled to each other so as to be pivotable relative to each other. The other end of the first hydraulic cylinder 229 is interlocked and coupled with the distal end-side arm portion 225a formed integrally with the first link 225.

The second hydraulic cylinder 230 is provided on the side opposite to the first hydraulic cylinder 229, i.e., outward of the first link 225 in the front-rear direction of the vehicle body, so as to substantially extend in the longitudinal direction of the first link 225. One end of the second hydraulic cylinder 230 is interlocked and coupled with the base end-side arm portion 225b that is formed integrally with the base end-side portion of the first link 225. The other end of the second hydraulic cylinder 230 is interlocked and coupled with an arm portion 35 that is formed integrally with a base end-side portion of the second link 226, using a third interlocking member 234. The other end of the second hydraulic cylinder 230 is also interlocked and coupled with a swing-side portion of the first link 225, using another/fourth interlocking member 236. The two end portions of the third interlocking member 234 and the two end portions of the fourth interlocking member 236 are pivotally coupled to each other so as to be pivotable relative to each other.

When the first hydraulic cylinder 229 is extended and contracted in a state where the action of the second hydraulic cylinder 230 has been stopped, the first link 225, the second link 226 and the travel wheel 202 integrally swing about the horizontal axis X1 in the portion that is pivotally coupled to the base end portion 224, while keeping their relative postures unchanged. When the second hydraulic cylinder 230 is extended and contracted in a state where the action of the first hydraulic cylinder 229 has been stopped, the second link 226 and the travel wheel 202 integrally swing about the horizontal axis X2 in the portion where the first link 225 and the second link 226 are coupled to each other, while the posture of the first link 225 is kept unchanged.

An auxiliary wheel 203 is supported by an intermediate bending portion of each of the plurality of bending link mechanisms 204 so as to be rotatable. The auxiliary wheels 203 are formed of wheels that have substantially the same outer diameter as the travel wheels 202. The coupling support shaft 228 for pivotally coupling the first link 225 and the second link 226 to each other is formed so as to extend further outward in the width direction of the vehicle body than the second link 226. An auxiliary wheel 203 is supported by the extended protrusion of the coupling support shaft 228 so as to be rotatable.

The hydraulic motor 206 is provided so as to be located between the intermediate bending portion of the bending link mechanism 204, i.e., a portion on which the auxiliary wheel 203 is located, and the support portion of the travel wheel 202. Specifically, as shown in FIG. 21, the hydraulic motor 206 is mounted on and supported by an upper portion of the L-shaped extension portion 226A of the second link 226.

The hydraulic motor 206 is configured to drive the travel wheel 202 and the auxiliary wheel 203 of the bending link mechanism 204 in which the hydraulic motor 206 is provided. Power from the hydraulic motor 206 is transmitted to the travel wheel 202 and the auxiliary wheel 203 via a chain power transmission mechanism 240. As shown in FIG. 20, two drive sprockets 242, 243 are integrally rotatably supported on a lateral output shaft 241 of the hydraulic motor 206. A first transmission chain 245 is wound around one of the drive sprockets, namely the drive sprocket 242, and a driven sprocket 244 that is integrally rotatably supported by a rotary support shaft 202A of the travel wheel 202. A second transmission chain 247 is wound around the other of the two drive sprockets 242, 243, namely the drive sprocket 243, and a driven sprocket 246 that is integrally rotatably supported by a rotary support shaft 203A of the auxiliary wheel 203. The chain power transmission mechanism 240 is surrounded by a case 248 so as not to be entangled with weeds, stalk culms or the like.

The two drive sprockets 242, 243 are formed so as to have the same diameter and the same number of teeth. The two driven sprockets 244, 246 are formed so as to have the same diameter and the same number of teeth. Also, the travel wheel 202 and the auxiliary wheel 203 are formed so as to have the same outer diameter. Therefore, the travel wheel 202 and the auxiliary wheel 203 are synchronously driven at the same rotation speed as the hydraulic motor 206 is driven to rotate.

Figure 22:
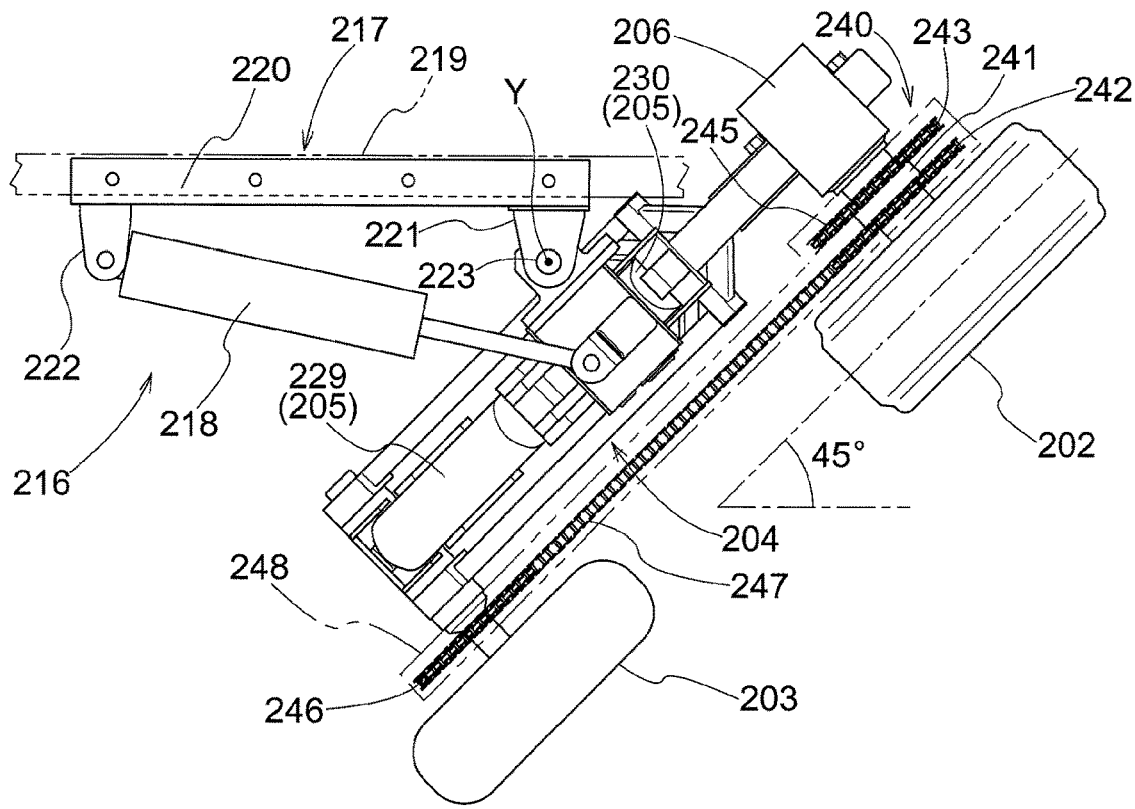
FIG. 22 is a plan view showing a left-turn state caused by a turning mechanism.
Figure 23:
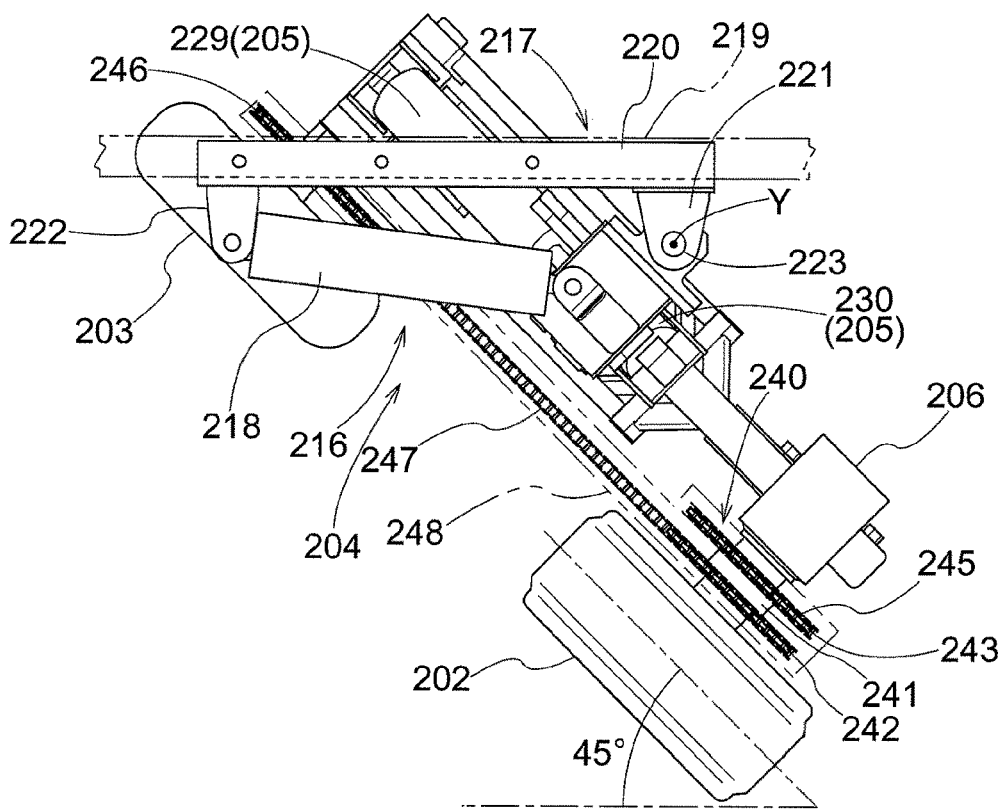
FIG. 23 is a plan view showing a right-turn state caused by the turning mechanism.

As shown in FIGS. 22 and 23, the bending link mechanism 204, the travel wheel 202, the auxiliary wheel 203, the hydraulic motor 206, the change power transmission mechanism 240 and the posture change operation means 205 are integrally supported by the outer pivot bracket 221 so as to be pivotable about the axis Y of the pivot support shaft 223. As a result of the turning cylinder 218 being operated to extract and contract, they are integrally operated to pivot. They can be operated to turn by approximately 45 degrees to the left-turn direction and the right-turn direction from the straight-travelling state in which the travel wheel 202 is orientated in the front-rear direction.

Figure 24:
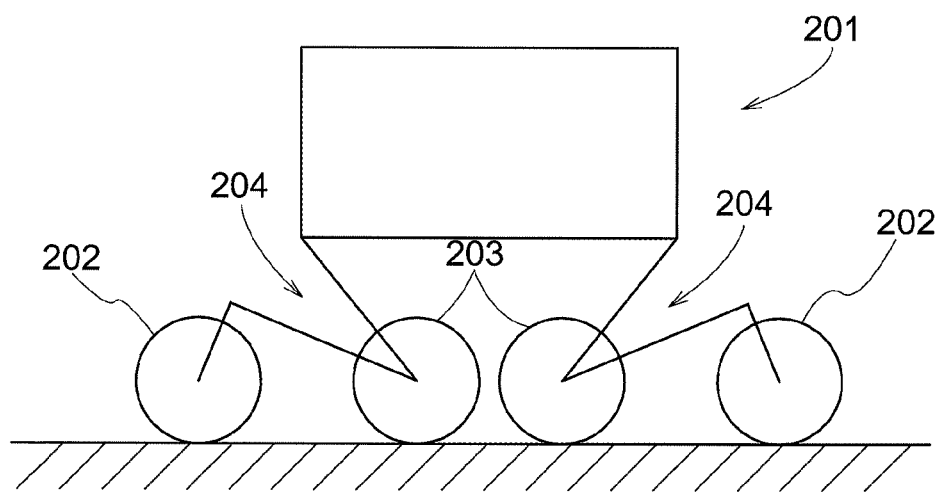
FIG. 24 is a side view showing a flat ground travelling state of the work vehicle.
Figure 25:
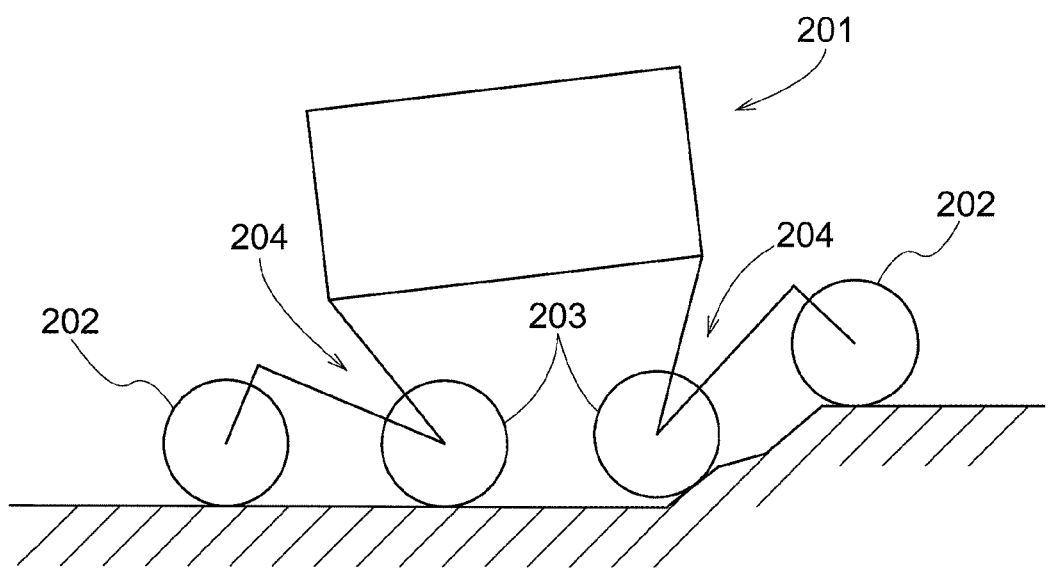
FIG. 25 is a side view showing a move-over-a-step state of the work vehicle.

When the work vehicle travels on an even ground, for example, as shown in FIG. 24, all the travel wheels 202 and all the auxiliary wheels 203 are driven to rotate in a grounded state, and thus the turn travel can be smoothly performed using the driving force of all the travel wheels 202 and all the auxiliary wheels 203. When the work vehicle travels over steps or the like, for example, as shown in FIG. 25, the work vehicle travels in a state where the travel wheels 202 and the auxiliary wheels 203 supported by the bending link mechanisms 204 on the rear side in the direction of travel, and the auxiliary wheels 203 supported by the bending link mechanisms 204 on the front side in the direction of travel, are grounded on the lower travel surface, while placing the travel wheels 202 supported by the bending link mechanisms 204 on the front side in the direction of travel on the upper step. Thus, the work vehicle can travel over the steps. At this time, the auxiliary wheels 203 supported by the refraction link mechanisms 204 on the front side in the direction of travel are driven to rotate, and thus the work vehicle can smoothly travel over the steps.

Also, although not shown in the drawings, the work vehicle may travel with all the auxiliary wheels 203 being grounded and all the travel wheels 202 being raised. In such a travel mode, for example, when travelling over a step, the work vehicle can approach a position that is immediately before the steps, and the work vehicle can travel over the steps by placing the travel wheels 202 and the second links 226, which are raised, on the step, in the same state. Furthermore, there is another advantage in that the distance between the grounded wheels in the front-rear direction is small, and the work vehicle can perform small-turn travel, for example.

Although not shown in the drawings, it is possible to remove the turning mechanism 216, the bending link mechanism 204, the travel wheel 202, the auxiliary wheel 203, the hydraulic motor 206, the chain power transmission mechanism 240 and the posture change operation means 205 from the vehicle body 201 in a state of being integrally attached to each other, by releasing the bolt coupling of the coupling member 220 with the front-rear frame member 219. Also, it is possible to attach the above-described devices to the vehicle body 201 in a state of being integrally attached to each other, by bolting the coupling member 220 to the front-rear frame member 219.

Hydraulic oil is supplied from the hydraulic supplier 208 to the first hydraulic cylinder 229 and the second hydraulic cylinder 230 of each of the plurality of bending link mechanisms 204 via the valve mechanism 209. The valve mechanism 209 supplies and discharges hydraulic oil, using the hydraulic control valves 211, to extend and contract the first hydraulic cylinder 229 and the second hydraulic cylinder 230.

As shown in FIG. 18, the travel wheels 202 are provided with rotation sensors S6 (examples of drive speed detection means) that detect the rotation speeds of the travel wheels 202 driven by the hydraulic motors 206. The supply of hydraulic oil to the hydraulic motors 206 is controlled so that the rotation speeds of the travel wheels 202 equal target values, based on the rotation speeds of the travel wheels 202 detected by the rotation sensors S6.

That is to say, the hydraulic control valves 211 adjust the flow rate of the hydraulic oil, using the hydraulic control valves 211 corresponding to the hydraulic motors 206, and thus the rotation speeds of the hydraulic motors 206, i.e., the rotation speeds of the travel wheels 202 and the auxiliary wheels 203, can be changed.

Each of the four first hydraulic cylinders 229 and each of the four second hydraulic cylinders 230 are provided with a stroke sensor (not shown) that can detect the amount of extension/contraction operation. The vehicle body 201 is provided with an acceleration sensor S5, which is, for example, a three-axis acceleration sensor or the like. Based on the result of detection by the acceleration sensor S5, the inclination of the vehicle body 201 in the front, rear, right and left directions is detected, and the posture of the vehicle body 201 is controlled based on the result. That is to say, the supply of hydraulic oil to the first hydraulic cylinder 229 and the second hydraulic cylinder 230 is controlled so that the posture of the vehicle body 201 equals a target posture.

The hydraulic cylinders 229, 230 and the hydraulic motors 206 are controlled by the control device 213 based on control information input through manual operation, control information set and stored in advance or the like.

As described above, the work vehicle is configured to change the posture of the bending link mechanisms 204 by using the hydraulic cylinders 229, 230, and is also configured to be driven by the hydraulic motors 206 to travel. Therefore, the work vehicle is unlikely to be affected by moisture, fine dust or the like, and is suitable for agricultural work.

Other Embodiments Modified from Third Embodiment (1) The above-described embodiment employs a configuration in which power from the hydraulic motors 206, which serve as travel drive devices, is transmitted to the travel wheels 202 and the auxiliary wheels 203 via the chain power transmission mechanisms 240. However, instead of such a configuration, it is possible to employ a configuration in which power from the hydraulic motors 206 is transmitted to the travel wheels 202 and the auxiliary wheels 203 via a power transmission belt, or a configuration in which power is transmitted via a gear power transmission mechanism in which power is transmitted by a plurality of gears that engage with each other.

(2) The above-described embodiment employs a configuration in which a travel drive device (a hydraulic motor 206) is provided so as to be located between the intermediate bending portion of the bending link mechanism 204 and the support portion of the travel wheel 202. However, instead of such a configuration, it is possible to employ a configuration in which the travel drive device (the hydraulic motor 206) is supported on the vehicle body 201 side.

(3) The above-described embodiment employs a configuration in which the travel drive devices are constituted by the hydraulic motors 206 that drive the travel wheel 202 and the auxiliary wheel 203 included in the bending link mechanism 204 corresponding thereto. However, instead of such a configuration, it is possible to employ various configurations, such as a configuration in which the travel wheels 202 are driven by an electric motor, and a configuration in which power from the engine is transmitted to each of the travel wheels 202 via a continuously variable transmission mechanism.

(4) The above-described embodiment employs a configuration in which the posture change operation means 205 include a plurality of hydraulic cylinders 229, 230. However, instead of such a configuration, it is possible to employ a configuration in which a hydraulic motor, an electric motor or the like is provided at a pivot point between links so that the posture can be changed.

(5) The above-described embodiment employs a configuration in which the bending link mechanism 204 includes two links 225 and 226 that are pivotally coupled to each other. However, instead of such a configuration, it is possible to employ a configuration in which three or more links are provided.

DESCRIPTION OF REFERENCE MARKS

First Embodiments and Second Embodiment

1: Vehicle Body
2: Travel Wheel
4: Raising/Lowering Support Mechanism (Bending Link Mechanism)
5: Posture Change Operation Means
6: Travel Drive Device (Hydraulic Motor)
7: Base (Vehicle Body Frame)
8: Hydraulic Supplier
10: Support Frame
13: Control Means
15: Control Means
16: Turning Operation Means
17: Turning Support Portion
18: Turning Cylinder
25: First Link
26: Second Link
29: First Hydraulic Cylinder
30: Second Hydraulic Cylinder
100: Control Means (Posture Control Unit)
102: Determination Means (Determination Unit)
S1, S2: Pressure Sensor
S3: Position Detection Sensor
S4: Pressure Sensor
S6: Drive Speed Detection Means (Rotation Sensor)
Q: Idling State Detection Means Third Embodiment 201: Vehicle Body
202: Travel Wheel
203: Auxiliary Wheel
204: Bending Link Mechanism
205: Posture Change Operation Means
206: Travel Drive Device
225: First Link
226: Second Link
229: First Hydraulic Cylinder
230: Second Hydraulic Cylinder
X1, X2: Horizontal Axis

What is claimed is:

1. A work vehicle comprising:
a plurality of travel wheels that are respectively located on right and left sides of front and rear portions of a vehicle body;
a plurality of bending link mechanisms that support the plurality of travel wheels on the vehicle body so as to be capable of being individually raised and lowered;
a posture change operation device capable of individually changing postures of the plurality of bending link mechanisms; and
a control unit for controlling actions of the posture change operation device,
wherein each of the bending link mechanisms includes:
a first link that has one end portion that is supported by the vehicle body so as to be pivotable about a horizontal axis, and
a second link that has one end portion that is pivotally coupled to the other end portion of the first link so as to be pivotable about a horizontal axis, and another end portion that supports a travel wheel,
the posture change operation device includes:
a first hydraulic cylinder capable of changing a swing posture of the first link relative to the vehicle body, and
a second hydraulic cylinder capable of changing a swing posture of the second link relative to the first link,
the work vehicle further comprises position detection sensors that detect swing positions of the first links, and pressure sensors that detect pressure of oil chambers of the second hydraulic cylinders, and
the control unit is configured to control actions of the first hydraulic cylinders during traveling of the work vehicle so that the swing positions of the first links equal target positions, based only on results of detection performed by the position detection sensors, and control actions of the second hydraulic cylinders during traveling of the work vehicle so that thrusts have target values, based only on results of detection performed by the pressure sensors.

2. The work vehicle according to claim 1, wherein each of the plurality of travel wheels is provided with a hydraulic motor that drives and rotates the travel wheel.

3. The work vehicle according to claim 1, wherein an auxiliary wheel is provided in a portion where the first link and the second link are pivotally coupled to each other.

4. A work vehicle comprising:
a vehicle body that is provided with a base;
a plurality of travel wheels that are respectively located on right and left sides of front and rear portions of the vehicle body;
a plurality of bending link mechanisms that support the plurality of travel wheels on the vehicle body so as to be capable of being individually raised and lowered;
a posture change operation device of a hydraulic operation type, capable of individually changing postures of the plurality of bending link mechanisms;
a hydraulic supplier that feeds out hydraulic oil to the posture change operation device; and
a supporting frame that supports the hydraulic supplier is coupled to a lower portion of the base,
wherein the hydraulic supplier is provided below the base of the vehicle body, and,
wherein the supporting frame is configured to be attachable to the base and detachable from the base by moving the supporting frame in a lateral direction of the vehicle body in a state of supporting the hydraulic supplier.

5. The work vehicle according to claim 4, wherein the support frame is configured to be able to maintain a posture of the entire vehicle body with a lower end portion thereof being in contact with the ground.

6. The work vehicle according to claim 4, wherein the hydraulic supplier includes an engine and a hydraulic pump that is driven by the engine.

7. The work vehicle according to claim 4, wherein
each of the bending link mechanisms includes:
   a first link that has one end portion that is supported by the base so as to be pivotable about a horizontal axis, and
   a second link that has one end portion that is supported by the other end portion of the first link so as to be pivotable about a horizontal axis, and another end portion that supports a travel wheel, and
the posture change operation device includes:
   a first hydraulic cylinder capable of changing a swing posture of the first link relative to the base, and
   a second hydraulic cylinder capable of changing a swing posture of the second link relative to the first link.

8. A work vehicle comprising:
a plurality of travel wheels that are respectively located on right and left sides of front and rear portions of a vehicle body;
a plurality of travel drive devices that individually drive the plurality of travel wheels;
raising/lowering support mechanisms that support the plurality of travel wheels on the vehicle body so as to be capable of being individually raised and lowered;
a plurality of posture change operation devices capable of individually changing postures of the plurality of raising/lowering support mechanisms;
a control unit for controlling actions of the posture change operation device; and
an idling state detection device for detecting whether or not the travel wheels are in an idling state,
wherein the control unit is configured to, upon the idling state detection device detecting that a travel wheel is in an idling state, control actions of the posture change operation devices so that a raising/lowering support mechanism lowers the travel wheel.

9. The work vehicle according to claim 8, wherein
the travel drive devices include a hydraulic motor, and
the idling state detection device includes:
   a pressure sensor that detects an internal pressure of a hydraulic oil supply path in the hydraulic motor, and
   a determination device for determining that the travel wheel is in an idling state upon the internal pressure falling below a preset value, based on information detected by the pressure sensor.

10. The work vehicle according to claim 8, wherein
the idling state detection device includes:
   a drive speed detection device for detecting a drive speed of the travel drive device,
   a travel speed detection device for detecting an actual travel speed of the vehicle body, and
   a determination device for determining that the vehicle wheel is in an idling state when the drive speed of the travel drive device detected by the drive speed detection device is greater than the actual travel speed detected by the travel speed detection device, by a preset amount or more.

11. A work vehicle comprising:
a plurality of travel wheels that are respectively located on right and left sides of front and rear portions of a vehicle body;
a plurality of bending link mechanisms that support the plurality of travel wheels on the vehicle body so as to be capable of being individually raised and lowered;
a posture change operation device capable of individually changing postures of the plurality of bending link mechanisms;
a plurality of turning operation devices for respectively supporting the plurality of bending link mechanisms on the vehicle body such that orientations thereof can be changed about vertical axes; and
a control unit for controlling actions of the posture change operation device and the turning operation devices,
wherein the control unit is configured to, when performing an operation change orientation on either the front right and left travel wheels or the rear right and left travel wheels, controls an action of the posture change operation device so that a position of a center of gravity of the vehicle body moves toward a side opposite to a side to which the orientation change operation is performed, in a front-rear direction of the vehicle body.

12. The work vehicle according to claim 11, wherein
the control unit is configured to control an action of the posture change operation device such that the bending link mechanisms located on a side, to which an orientation change operation is performed in a front-rear direction of the vehicle body, moves the vehicle body away from the travel wheels that are supported by the bending link mechanisms and are in contact with the ground, and
the control unit is configured to control an action of the posture change operation device such that the bending link mechanisms located opposite to the side to which the orientation change operation is performed in the front-rear direction of the vehicle body, moves the vehicle body closer to the travel wheels that are supported by the bending link mechanisms and are in contact with the ground.

13. The work vehicle according to claim 11, wherein
each of the bending link mechanisms includes:
   a first link that has one end portion that is supported by a base so as to be pivotable about a horizontal axis, and
   a second link that has one end portion that is supported by the other end portion of the first link so as to be pivotable about a lateral axis, and another end portion that supports a travel wheel, and
each of the turning operation devices includes:
   a turning support portion that supports the first link on the vehicle body such that an orientation thereof can be changed about the vertical axis, and
   a turning operation hydraulic cylinder that performs an operation to integrally change orientations of the first link and the second link about the vertical axis.

14. A work vehicle comprising:
a plurality of travel wheels that support a vehicle body and are driven to travel;
a plurality of bending link mechanisms that support each of the plurality of travel wheels on the vehicle body so as to be capable of being individually raised and lowered;
a posture change operation device capable of individually changing postures of the plurality of bending link mechanisms;
auxiliary wheels that are respectively supported by intermediate bending portions of each of the plurality of bending link mechanisms; and
travel drive devices that drive and rotate the travel wheels and the auxiliary wheels.

15. The work vehicle according to claim 14, wherein
the travel drive devices are individually provided for the plurality of bending link mechanisms, and the travel drive devices include hydraulic motors that drive the travel wheels and the auxiliary wheels of the bending link mechanisms.

16. The work vehicle according to claim 15, wherein
the travel drive devices are located between the intermediate bending portions of the bending link mechanisms and support portions of the travel wheels.

17. The work vehicle according to claim 14,
wherein each of the bending link mechanisms includes:
- a first link that has one end portion that is supported by a base so as to be pivotable about a horizontal axis, and
- a second link that has one end portion that is supported by the other end portion of the first link so as to be pivotable about a lateral axis, and another end portion that supports a travel wheel, the posture change operation device includes:
- a first hydraulic cylinder capable of changing a swing posture of the first link relative to the vehicle body, and
- a second hydraulic cylinder capable of changing a swing posture of the second link relative to the first link, and the auxiliary wheel is supported on a portion where the first link and the second link are pivotally coupled to each other.

\* \* \* \* \*